US012761023B2

(12) United States Patent
Kahle et al.

(10) Patent No.: US 12,761,023 B2
(45) **Date of Patent: *Oct. 13, 2026**

(54) TOTAL STATION LOOKBACK

(71) Applicant: Trimble Inc., Westminster, CO (US)

(72) Inventors: Kent Kahle, Hayward, CA (US); David Hyland, Westminster, CO (US); Benedict JG Atkins, Broomfield, CO (US); Eliot Jones, Denver, CO (US); Marc Howell, Albany, OR (US); Steven Ostrowski, Columbus, OH (US)

(73) Assignee: Trimble Inc., Westminster, CO (US)

( * ) Notice: Subject to any disclaimer, the term of this patent is extended or adjusted under 35 U.S.C. 154(b) by 101 days.

This patent is subject to a terminal disclaimer.

(21) Appl. No.: 18/921,267

(22) Filed: Oct. 21, 2024

(65) Prior Publication Data

US 2025/0044085 A1 Feb. 6, 2025

Related U.S. Application Data

(63) Continuation of application No. 18/380,293, filed on Oct. 16, 2023, now Pat. No. 12,146,741, which is a (Continued)

(51) Int. Cl.
*G06F 3/01* (2006.01)
*A42B 3/04* (2006.01)
(Continued)

(52) U.S. Cl.
CPC ............ *G01C 15/002* (2013.01); *A42B 3/042* (2013.01); *A42B 3/0433* (2013.01); *A42B 3/30* (2013.01);
(Continued)

(58) Field of Classification Search
CPC ...... G01C 15/002; G01C 1/04; G01C 15/006; G01C 21/3826; A42B 3/042;
(Continued)

(56) References Cited

U.S. PATENT DOCUMENTS

| | | | |
|---|---|---|---|
| 9,791,700 | B2 | 10/2017 | Schowengerdt |
| 10,382,746 | B1 | 8/2019 | Shapiro et al. |

(Continued)

OTHER PUBLICATIONS

"HoloLens 2", Microsoft, Available Online at: https://www.microsoft.com/en-us/hololens>, Accessed from Internet on Oct. 8, 2020, 4 pages.

(Continued)

*Primary Examiner* — Chong Wu
(74) *Attorney, Agent, or Firm* — Kilpatrick Townsend & Stockton LLP

(57) ABSTRACT

A system for surveying includes, a base station, for being positioned with respect to an environment, and an augmented-reality device. The augmented-reality device, such as a head-mounted display, has one or more cameras. An image of the base station is acquired by at least of the one or more cameras. An offset from the augmented-reality device to the base station is calculated based on the image. A position of the augmented-reality device with respect to the environment is calculated based on the offset and the base station positioned with respect to the environment. A virtual object in relation to the environment can then be presented to a user, using the augmented-reality device.

20 Claims, 16 Drawing Sheets

Related U.S. Application Data continuation of application No. 17/987,277, filed on Nov. 15, 2022, now Pat. No. 11,821,730, which is a continuation of application No. 16/924,651, filed on Jul. 9, 2020, now Pat. No. 11,512,956.

(51) Int. Cl.

| | |
|---|---|
| ***A42B 3/30*** | (2006.01) |
| ***G01C 1/04*** | (2006.01) |
| ***G01C 15/00*** | (2006.01) |
| ***G06T 7/73*** | (2017.01) |

(52) U.S. Cl.

CPC ............... *G01C 1/04* (2013.01); *G06F 3/012* (2013.01); *G06F 3/013* (2013.01); *G06T 7/73* (2017.01)

(58) Field of Classification Search

CPC ......... A42B 3/0433; A42B 3/30; G06F 3/012; G06F 3/013; G06F 3/011; G06F 3/0304; G06T 7/73

See application file for complete search history.

(56) References Cited

U.S. PATENT DOCUMENTS

| | | | | |
|---|---|---|---|---|
| 11,221,217 | B1 * | 1/2022 | Kahle | G01S 17/42 |
| 11,360,310 | B2 | 6/2022 | Lawver et al. | |
| 11,373,381 | B1 | 6/2022 | Kahle et al. | |
| 11,512,956 | B2 | 11/2022 | Kahle et al. | |
| 11,821,730 | B2 | 11/2023 | Kahle et al. | |
| 12,146,741 | B2 * | 11/2024 | Kahle | G06T 7/73 |
| 2009/0113732 | A1 | 5/2009 | Rodriguez et al. | |
| 2012/0307075 | A1 | 12/2012 | Margalit | |
| 2013/0169514 | A1 | 7/2013 | Edwards et al. | |
| 2014/0368373 | A1 | 12/2014 | Crain et al. | |
| 2016/0378176 | A1 | 12/2016 | Shiu et al. | |
| 2017/0337743 | A1 | 11/2017 | Metzler et al. | |
| 2019/0094021 | A1 | 3/2019 | Singer | |
| 2019/0122174 | A1 | 4/2019 | Gil | |
| 2019/0299732 | A1 | 10/2019 | Smith et al. | |
| 2020/0034638 | A1 | 1/2020 | Brewington et al. | |
| 2020/0209394 | A1 | 7/2020 | Mark et al. | |
| 2020/0342673 | A1 * | 10/2020 | Lohr | G06F 3/011 |
| 2021/0019953 | A1 | 1/2021 | Pekelny et al. | |
| 2022/0011103 | A1 | 1/2022 | Kahle et al. | |
| 2022/0011104 | A1 | 1/2022 | Kahle et al. | |
| 2023/0152093 | A1 | 5/2023 | Kahle et al. | |

OTHER PUBLICATIONS

"Prisms & Targets", Optical Accessories, Trimble, Available Online at: https://geospatial.trimble.com/Optical-Accessories#OpticalPrismsTargets>, Accessed from Internet on Oct. 7, 2020, 3 pages.

"Trimble Connect for HoloLens", Trimble, Available Online at: https://mixedreality.trimble.com/>, Accessed from Internet on Oct. 8, 2020, 8 pages.

"Trimble SX10 Scanning Total Station", Trimble Geospatial, Available Online at: https://geospatial.trimble.com/products-and-solutions/trimble-sx10>, Accessed from Internet on Oct. 7, 2020, 12 pages.

"Tripods & Rods", Optical Accessories, Trimble Geospatial, Available Online at: https://geospatial.trimble.com/Optical-Accessories#OpticalTripods%26Rods>, Accessed from Internet on Oct. 7, 2020, 3 pages.

"Your Data. Your Work Site. Together at Last.", Trimble, Field Technology, Available Online at: https://fieldtech.trimble.com/en/products/mixed-reality-visualization?utm_source=google&utm_medium=cpc&utm_campaign=mixed_reality&utm_content=mixed_reality>, Accessed from Internet on Oct. 7, 2020, 6 pages.

* cited by examiner

TOTAL STATION LOOKBACK

CROSS-REFERENCES TO RELATED APPLICATIONS

This application is a continuation of U.S. application Ser. No. 18/380,293, filed Oct. 16, 2023, which is a continuation of U.S. application Ser. No. 17/987,277, filed Nov. 15, 2022, now U.S. Pat. No. 11,821,730, which is a continuation of U.S. application Ser. No. 16/924,651, filed Jul. 9, 2020, now U.S. Pat. No. 11,512,956, the entire contents of which are incorporated by reference in their entirety for all purposes. The following three U.S. patent applications were filed concurrently, and the entire disclosures are incorporated by reference for all purposes: application Ser. No. 16/924,648, filed Jul. 9, 2020, entitled "Augmented Reality Technology as a Controller for a Total Station"; application Ser. No. 16/924,650, filed Jul. 9, 2020, entitled "Layout Workflow with Augmented Reality and Optical Prism"; and application Ser. No. 16/924,651, filed Jul. 9, 2020, entitled "Construction Layout Using Augmented Reality."

BACKGROUND

This disclosure relates in general to surveying systems and augmented reality. Surveying systems determine positions of points relative to each other and/or to the Earth. Surveying can be used in many applications by land surveyors, construction professionals, and civil engineers. Surveying often uses specialized and/or expensive equipment, such as laser levels, surveying rods, total stations, laser scanners, and GNSS (Global Navigation Satellite System) receivers.

In augmented reality, one or more virtual objects (e.g., computer-generated graphics) can be presented to a user in relation to real-world objects. Augmented reality can include a see-through display with a virtual object shown to a user on the see-through display. An example of an augmented-reality system is the Microsoft HoloLens. Another type of augmented reality is overlaying a virtual object on an image of the real world. For example, a smartphone camera is used to acquire an image of objects in the real world. The smart phone then overlays a graphic on the image of the real world while presenting the image on a screen of the smart phone. Artificial reality is sometimes used to refer to both augmented reality and virtual reality.

BRIEF SUMMARY

This disclosure relates to surveying systems. More specifically, and without limitation, this disclosure relates to using artificial reality (e.g., a Microsoft HoloLens) in combination with one or more surveying system (e.g., a robotic total station) for more efficient measurement and/or layout.

In certain embodiments, a system for identifying points of interest during construction layout comprises: a base station configured to measure angles and distances from the base station to a reflector to generate position data of the reflector in relation to an environment; a wearable device; and one or more processors. The wearable device comprises: a hardhat; the reflector, wherein the reflector is fixedly coupled with the hardhat; an optical display fixedly coupled with the hardhat; a camera fixedly coupled with the hardhat; and/or a graphics engine configured to provide a local map based on images acquired by the camera. The one or more processors are configured to: receive the position data; orient the local map of the wearable device to the base station using the position data; and/or present to a user of the wearable device, using the optical display, a virtual object in relation to the environment, based on orienting the local map of the wearable device with the base station. In some embodiments, the optical display allows real-world light to pass through the optical display; the reflector is a prism; the reflector is a pattern of retroreflective stickers; the base station comprises a theodolite to measure angles between the base station and the reflector; the position data includes location data and orientation data; the position data includes location data, and orientation data is obtained measurement of an edge obtained from the local map; the reflector is a first reflector and the hardhat comprises a second reflector in a known orientation to the first reflector; the base station comprises an electronic distance measurement (EDM) device for measuring a distance from the base station to the reflector; and/or the system further comprises a tracking camera, separate from the base station and the wearable device, wherein the tracking camera provides imagery data used to determine position of the wearable device with the environment. In certain embodiments, an apparatus comprises a wearable device and one or more processors. The wearable device comprises a frame; a marker, wherein the marker is fixedly coupled with the frame; an optical display fixedly coupled with the frame; a camera fixedly coupled with the frame; and/or a graphics engine configured to provide a local map based on images acquired by the camera. The one or more processors are configured to receive position data relative to an environment; orient the local map of the wearable device to the environment using the position data; and/or present, using the optical display, a virtual object in relation to the environment. The marker can include a retroreflector, a two-dimensional design, a machine readable code; and/or a one-dimensional or two-dimensional barcode. The apparatus can comprise a camera on a back of the frame used to track a location and/or an orientation of a base station with respect to the frame. In some embodiments, a base station comprises a camera; the camera is separate from the base station; and/or the camera is configured to acquire images of the marker used to determine relative position of the marker in relation to the base station.

In certain embodiments, a method for using augmented reality in construction layout, the method comprises: measuring a position of a reflector in relation to a base station to obtain position data, wherein the reflector is fixedly coupled with a hardhat, and the base station is configured to measure angels and distances from the base station to the reflector in relation to an environment; generating a local map based on images acquired by a camera that is fixedly coupled with the hardhat; orienting the local map to the base station using the position data; and/or presenting to a user, using an optical display fixedly coupled with the hardhat, a virtual object in relation to the environment, based on orienting the local map with the base station. In some embodiments, the method further comprises orienting a model to the environment, and wherein the virtual object is from a feature of the model; and/or orienting the base station to the environment.

In certain embodiments, a system for using augmented reality for building layout comprises a surveying pole; a base station; a wearable device comprising a camera; and/or one or more memory device containing instructions that, when executed, cause one or more processors to perform the following steps: determining a position of the surveying pole with respect to the base station, wherein a location of the base station is calibrated with respect to an environment; measuring a location of a first point using the surveying pole based on the position of the surveying pole with respect to the base station; determining that the surveying pole is out of a line of sight of the base station; generating a local map based on images acquired by the camera of the wearable device; determining an offset of the surveying pole with respect to the local map based on images of the surveying pole acquired by the camera, wherein the offset is determined after determining that the surveying pole is out of the line of sight of the base station; and/or measuring a location of a second point based on the offset of the surveying pole with respect to the wearable device. In some embodiments, the offset is a second offset; the instructions, when executed, further cause the one or more processors to determine a first offset of the surveying pole with respect to the local map based on images of the surveying pole acquired by the camera; the first offset is determined before determining that the surveying pole is out of the line of sight of the base station; the instructions, when executed, further cause the one or more processors to orient the local map to the environment based on the position of the surveying pole with respect to the base station and the first offset of the surveying pole with respect to the local map; the base station is a robotic total station; the base station is configured to not move relative to the environment during measurements; the surveying pole comprises a reflector; the surveying pole comprises a prism; and/or the instructions cause the one or more processors to perform the following steps: calculating cumulative errors over a duration of time while the surveying pole is out of the line of sight of the base station; determining the cumulative errors have exceeded a threshold value; indicating to a user of the wearable device that the cumulative errors have exceeded the threshold value; estimating coordinates of the surveying pole with respect to the environment, based on images from the camera while the surveying pole is out of the line of sight of the base station; and/or sending estimated coordinates of the surveying pole to the base station. In certain configurations, a wearable device comprises a frame; a camera coupled with the frame; and one or more memory devices containing instructions that, when executed, cause one or more processors to perform the following steps: determining that a surveying pole is out of a line of sight of a base station; generating a local map based on images acquired by the camera; determining an offset of the surveying pole with respect to the local map based on images of the surveying pole acquired by the camera, wherein the offset is determined after determining that the surveying pole is out of the line of sight of the base station; and/or measuring a location of a point based on the offset of the surveying pole with respect to the wearable device. In some embodiments, the offset is a second offset; the instructions, when executed, further cause the one or more processors to determine a first offset of the surveying pole with respect to the local map based on images of the surveying pole acquired by the camera; the first offset is determined before determining that the surveying pole is out of the line of sight of the base station; and/or the instructions, when executed, further cause the one or more processors to orient the local map to an environment based on a position of the surveying pole with respect to the base station and the first offset of the surveying pole with respect to the local map.

In certain embodiments, a method for using augmented reality for building layout comprises: determining a position of a surveying pole with respect to a base station, wherein a location of the base station is calibrated with respect to an environment; measuring a location of a first point using the surveying pole based on the position of the surveying pole with respect to the base station; determining that the surveying pole is out of a line of sight of the base station; generating a local map based on images acquired by a camera of a wearable device; calculating an offset of the surveying pole with respect to the local map based on images of the surveying pole acquired by the camera, wherein: the surveying pole can move independently from the camera of the wearable device, and the offset is determined after determining that the surveying pole is out of the line of sight of the base station; measuring a location of a second point using the surveying pole based on the offset of the surveying pole with respect to the wearable device; calibrating the location of the base station with respect to the environment; calculating cumulative errors over a duration of time while the surveying pole is out of the line of sight of the base station; determining the cumulative errors have exceeded a threshold value; indicating to a user of the wearable device that the cumulative errors have exceeded the threshold value; estimating coordinates of the surveying pole with respect to the environment, based on images from the camera while the surveying pole is out of the line of sight of the base station; sending estimated coordinates of the surveying pole to the base station; identifying a computer-readable code in the environment using one or more images acquired by the camera; and/or transmit data about the computer-readable code from the wearable device to the base station. In some embodiments, the offset is a second offset; the method further comprises determining a first offset of the surveying pole with respect to the local map based on images of the surveying pole acquired by the camera; the first offset is determined before determining that the surveying pole is out of the line of sight of the base station; the method further comprises orienting the local map to the environment based on the position of the surveying pole with respect to the base station and the first offset of the surveying pole with respect to the local map; the surveying pole comprises a prism; the camera is one of a plurality of cameras of the wearable device; and/or images from the plurality of cameras are used to generate the local map and/or determine the offset of the surveying pole with respect to the local map.

In certain embodiments, a system comprises a light source configured to direct light to form a target on a surface; a wearable device separate from the light source, the wearable device comprising a camera and a display; and one or more processors configured to: measure a relative location of the target to a base station; generate a local map based on a plurality of images acquired by the camera, wherein the local map includes a relative location of the target to the wearable device; orient the local map to an environment of the base station based on the relative location of the target to the base station, the relative location of the target to the wearable device, and a relative location of the base station to the environment; and/or present, on the display of the wearable device, a virtual object in relation to the environment and/or measure one or more coordinates of a physical object, based on orienting the local map of the wearable device with the environment. In some embodiments, the light source is a laser; the target is a spot; the target is a non-elliptical, two-dimensional design; the base station is separate from the light source; and/or the one or more processors are further configured to: ascertain an orientation of the wearable device in relation to the environment based on an orientation of a design of the target; receive a section of a design of the target from a user using the wearable device; track an eye of a user, and move a position of the target based on tracking the eye of the user; and/or move a position of the target in response to movement of the wearable device. In some embodiments, a system comprises a camera of a wearable device; a display of the wearable device; and one or more processors configured to: measure a relative location of a target to a base station; generate a local map based on a plurality of images acquired by the camera, wherein the local map includes a relative location of the target to the wearable device; orient the local map to an environment of the base station based on the relative location of the target to the base station, the relative location of the target to the wearable device, and a relative location of the base station to the environment; present, on the display of the wearable device, a virtual object in relation to the environment and/or measure one or more coordinates of a physical object, based on orienting the local map of the wearable device with the environment; and/or transmit an estimated location of the wearable device to the base station.

In certain embodiments, a method comprises directing light, from a light source, to form a target on a surface; measuring a relative location of the target to a base station; generating a local map based on images acquired by a camera of a wearable device, wherein the local map includes a relative location of the target to the wearable device; orienting the local map to an environment of the base station based on the relative location of the target to the base station, the relative location of the target to the wearable device, and a relative location of the base station to the environment; presenting, on a display of the wearable device, a virtual object in relation to the environment and/or measuring one or more coordinates of a physical object, based on orienting the local map of the wearable device with the environment; ascertaining a depth and/or orientation of a physical object in relation to the wearable device; calculating three-dimensional coordinates of the physical object in relation to the environment, wherein the local map includes a relative location of the physical object to the wearable device; calculating the three-dimensional coordinates of the physical object is based on the relative location of the physical object to the wearable device, the relative location of the target to the base station, and the relative location of the bases station to the environment; ascertaining an orientation of the wearable device in relation to the environment based on an orientation of a design of the target; tracking an eye of a user; moving a position of the target based on tracking the eye of the user; receiving, from a user, a selection of a design; directing light to form the target on the surface, wherein a shape of the target on the surface resembles the design; and/or moving a position of the target in response to movement of the wearable device. In some embodiments, the light source is a projector; the target is a spot; a location of the wearable device is based on relative position of the wearable device to the spot; and/or orientation of the wearable device is based on features in the environment imaged by the camera of the wearable device.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
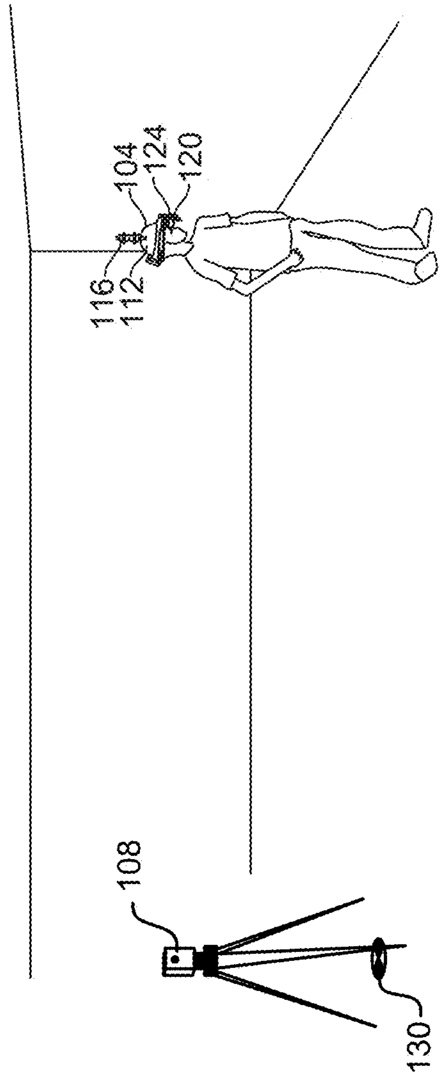
FIG. 1 depicts an embodiment of a system for identifying points of interest during construction layout.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment (s) will provide those skilled in the art with an enabling description for implementing a preferred exemplary embodiment. It is understood that various changes may be made in the function and arrangement of elements without departing from the spirit and scope as set forth in the appended claims.

Augmented reality can be used in surveying processes to increase efficiency in measurement and/or layout. In some embodiments, a reflector is coupled with a hardhat and an augmented-reality system. A robotic total station tracks the reflector to obtain position data of the reflector. The augmented-reality system orients itself with an environment based on the position data. The augmented-reality system presents to a user a virtual object (e.g., from a to-be-built model) in relation to the environment based on orienting itself with the environment using the position data from the total station. The augmented-reality system can render the virtual object more accurately with the environment based on position data from the total station. Examples of using a reflector coupled with a hardhat are given in FIGS. 1-8.

In some embodiments, "truth" can be transferred from a surveying pole to the augmented-reality system. Truth provides a reference from where measurements or positions are measured from. A surveying pole can be used as truth (e.g., the surveying pole is tracked by a total station, wherein truth of the surveying pole is derived from truth of the total station). As a user moves out of line of sight of the total station (e.g., the user goes behind an obstruction), the surveying pole is not used as truth. Instead, truth is transferred to the wearable device by using position and/or mapping of the augmented-reality system. In some embodiments, position and/or mapping of the augmented-reality system is not as accurate as using data from the total station, and errors can accumulate by not using the total station. Accordingly, the augmented-reality system can track errors and/or present estimated errors to a user. The augmented-reality system can also transmit estimated position of the surveying pole to the total station so the total station can more efficiently re-acquire tracking of the surveying pole (e.g., after the user emerges from the obstruction). Examples of transferring truth from a surveying pole to a wearable device are given FIGS. 9-14.

In some embodiments, a target is used as truth for measurements and/or layout. A laser (e.g., from a robotic total station), and be used to form a target on a surface. The total station measures a position of the target relative to an environment. An augmented-reality system measures a position of the target relative to the augmented-reality system and/or orients a local map of the augmented-reality system with the environment based on both the position of the target relative to the augmented-reality system and the position of the target relative to the environment. Examples of using a target for truth are given FIGS. 15-17.

Though example figures for example embodiments are given above, embodiments are not meant to be mutually exclusive. For example, truth could be transferred from a hardhat mounted reflector to an augmented-reality system, or to a target off the hardhat, when a user wearing the hardhat moves behind an obstruction.

Referring first to FIG. 1, an embodiment of a system for identifying points of interest during construction layout is depicted. The system comprises a wearable device 104 and a base station 108. The wearable device 104 comprises a hardhat 112, a reflector 116, an optical display 120, and a camera 124.

The reflector 116, the optical display 120, and the camera 124 are fixedly coupled with the hardhat 112. In some embodiments, fixedly coupled means attached so as to block relative motion while in use. In some embodiments, the optical display 120 and the camera 124 are part of an augmented-reality system. The camera 124 is configured to acquire a plurality of images. A graphics engine (e.g., of the augmented-reality system) is configured to generate a local map of the surrounding area, e.g., using a simultaneous localization and mapping (SLAM) algorithm. The wearable device 104 is configured to be worn by the user while in use.

The base station 108 is configured to measure angles and/or distances from the base station 108 to the reflector 116 to generate position data of the reflector 116 in relation to an environment. In some embodiments, the base station 108 is a robotic total station. The base station 108 can include a theodolite, an image sensor, a laser having a visible wavelength, and/or an electronic distance measurement (EDM) unit. For example, angles can be measured from the base station 108 using a theodolite and/or an image sensor. Distances from the base station 108 to the reflector 116 can be measured using an EDM unit. Distances from the base station 108 to the reflector 116 can be measured by a position of the reflector 116 on an image sensor in relation to a camera center. Distances from the base station 108 to the reflector 116 can be measured using a length of the reflector 116 on the image sensor, a known actual length of the reflector 116, and/or a focal length of optics used to focus an image of the reflector 116 on the image sensor. Position data can include location data (e.g., x, y, and z data of the wearable device 104 the base station 108) and/or orientation data of the wearable device 104. Position data can be generated by the base station 108 and/or the wearable device 104. For example, location data can be generated by the base station 108 and orientation data can be generated by the wearable device 104. The base station 108 can be configured to remain stationary during measurements.

The base station 108 is oriented to the environment. For example, the base station 108 is oriented to known point 130. In some embodiments, the base station 108 can be oriented to the environment by identifying locations of known targets and/or features of the environment.

A reflector 116 can include a prism, foil, a sticker, and/or retroreflector (e.g., a reflector that reflects light back toward a source for a wide range of incident angles, such as a corner reflector or cat eye reflector). A reflector 116 can be used in conjunction with an active target (e.g., LED light(s)) and/or a passive target (e.g., design, contrasting colors, etc.).

One or more processors are configured to receive position data; orient the local map of the wearable device 104 to the base station 108 using the position data; and/or present to a user of the wearable device 104, using the optical display 120, a virtual object in relation to the environment based on orienting the local map of the wearable device 104 with the base station 108. The one or more processors can be part of the wearable device 104, the base station 108, and/or a separate device, such as a computer, mobile device, and/or smart phone.

The virtual object can come from a model. The virtual object can be one or more points of interest from the model. For example, the model can include anchor points, and positions of the anchor points can be shown to the user, as virtual objects, by the optical display 120. By showing the user a virtual object in relation to the environment, construction tasks can be simplified. In the example above, a construction worker can see, through the optical display 120, a virtual object (e.g., a dot) where an anchor point is to be located on a physical wall.

In some embodiments, a wearable device comprises a frame (e.g., hardhat 112, glasses frame, head-mounted display, hat, cap, helmet, car muffs, and/or headband); a marker (e.g., a reflector, a light, a design, and/or one or more marks); an optical display (e.g., an augmented-reality display); a camera; a graphics engine; and/or one or more processors. The marker can be fixedly coupled with the frame; the optical display can be fixedly coupled with the frame; and/or the camera can be fixedly coupled with the frame. The graphics engine is configured to provide a local map based on images acquired by the camera (e.g., using a SLAM algorithm). One more processors are configured to receive position data; orient the local map of the wearable device to the base station using the position data; and/or present, using the optical display, a virtual object in relation to the environment. For example, a location of a virtual anchor point is shown in relation to a physical wall, floor, and/or ceiling. The base station 108 can measure position and/or orientation of the marker in relation to the base station 108. In embodiments having the optical display fixedly attached to the frame, and the marker also fixedly attached the frame, a known position and/or orientation of the optical display can be known in relation to the base station 108 because there is no movement between the wearable device and the marker.

Figure 2:
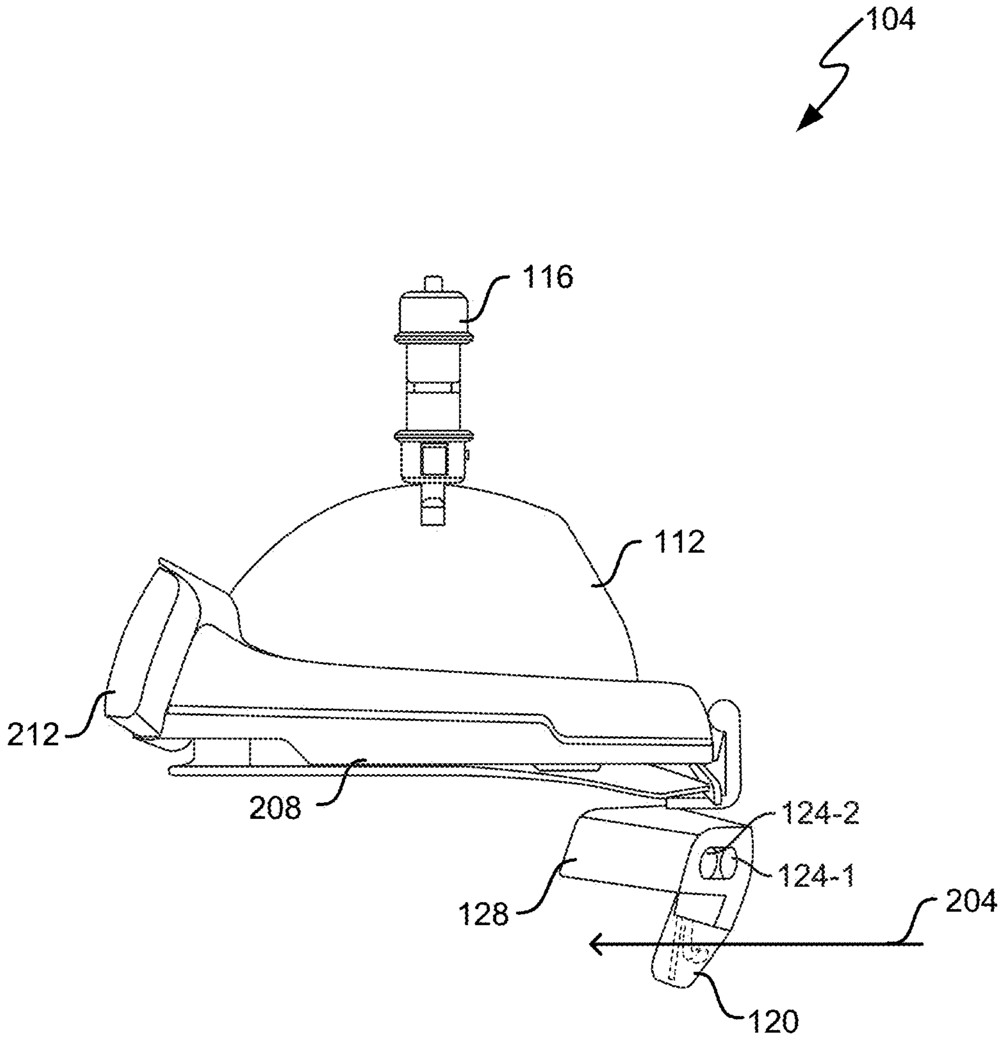
FIG. 2 depicts an embodiment of a wearable device.

FIG. 2 depicts an embodiment of the wearable device 104. The wearable device 104 comprises a hardhat 112, a reflector 116, an optical display 120, and a camera 124. The optical display 120 allows real-world light 204 to pass through the optical display 120. The optical display 120 is part of an augmented-reality system. The augmented-reality system presents a virtual object to a user of the wearable device 104 using the optical display 120 (e.g., by using a holographic waveguide or a polarized waveguide). In some embodiments, the wearable device 904 comprises a plurality of cameras 124 (e.g., as part of an augmented-reality system). A first camera 124-1 and a second camera 124-2 are shown on a right side of an augmented-reality system. The augmented-reality system can comprise more cameras. Other cameras 124 can be placed at a left side, a center (e.g., "between the eyes"), back, and/or other areas of the augmented-reality system and/or the housing 208. Cameras 124 can have different fields of view. For example, the first camera 124-1 has a first field of view and the second camera 124-2 has a second field of view, wherein the second field of view is wider than the first field of view. The plurality of cameras 124 can have a combined field of view (e.g., a field of view equal to or greater than 75, 90, 180, or 210 degrees, and/or equal to or less than 90, 180, 210, 270, or 360 degrees).

The reflector 116 is a prism. Other types of reflectors or targets could be used. The hardhat 112 is designed to be impact resistant. For example, the hardhat 112 is configured to comply with American National Standards Institute (ANSI) standard for head protection, Z89.1 (2009) or the Canadian standards Association (CSA) Industrial Protective Headwear, Z94.1 (2005).

The wearable device comprises a housing 208. The housing 208 couples the optical display 120 and/or the camera 124 to the hardhat 112. The housing 208 comprises a battery compartment 212 and/or one or more processors. The one more processors can be used to carry out processing tasks. In some embodiments, the housing 208 can be referred to as a frame. In some embodiments, the housing 208 is securely attached to the hardhat 112 and configured to not be removable by an end user (e.g., using adhesive or an inseparable snap fit) or not be removable by an end user without tools (e.g., using screws). In some embodiments, the hardhat 112 is configured so that the housing 208 is removably attached to the hardhat 112 (e.g., by the hardhat 112 having a separable snap-fit cantilever mechanism that secures the housing 208 to the hardhat).

In some embodiments, the wearable device 104 includes an inertial measurement unit (IMU), which can be used to provide orientation data (e.g., direction relative to force of gravity). The IMU can be integrated with the housing 208 and/or an augmented-reality system 128 comprising the one or more cameras 124 and the optical display 120.

Figure 3:
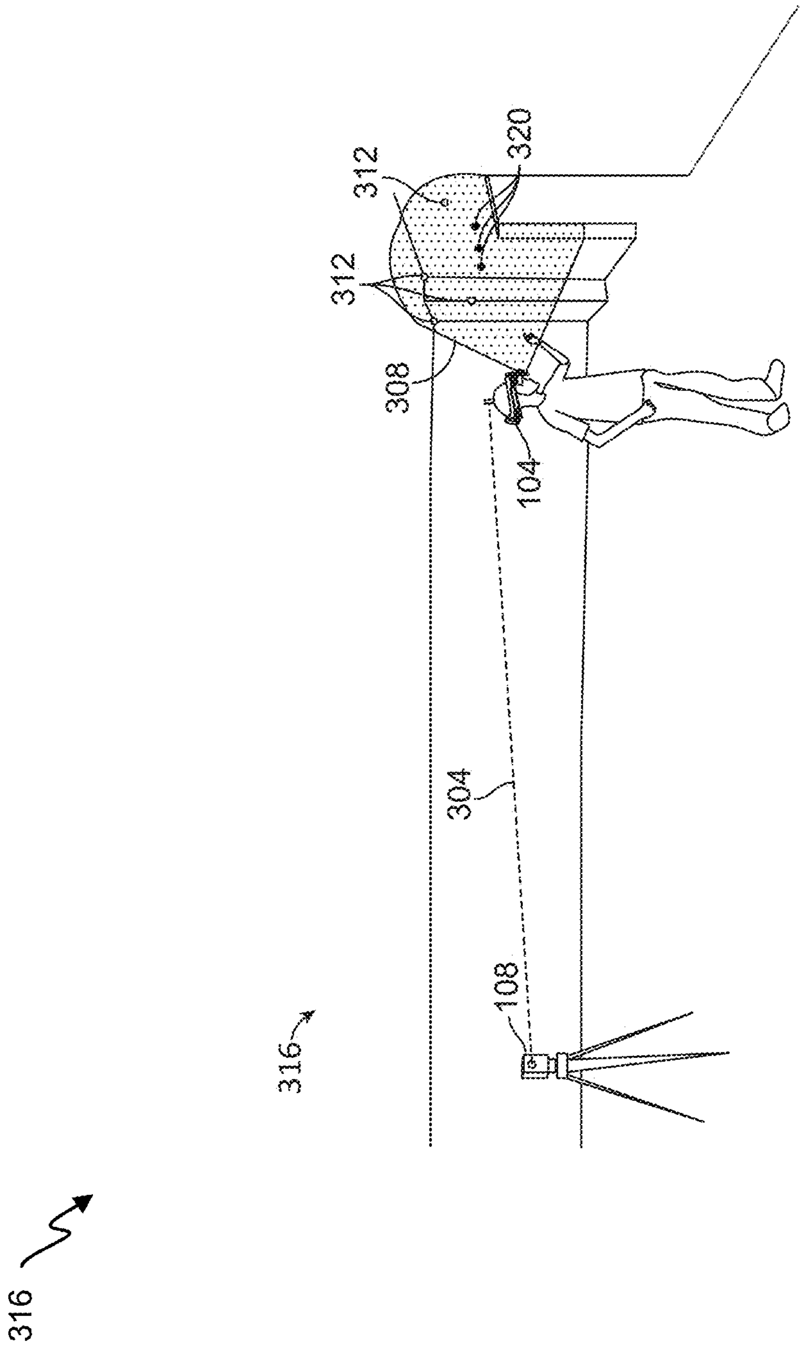
FIG. 3 is a simplified example of a relationship between position data and a local map.

FIG. 3 is a simplified example of a relationship between position data and a local map. The base station 108 tracks (e.g., visually) the wearable device 104 to determine a position of the wearable device 104 in relation to the base station 108 to obtain position data.

Position data can include a distance 304 between the base station 108 and the wearable device 104 and/or relative angle(s) (e.g., azimuth and/or altitude) of the wearable device 104 to the base station 108. In some embodiments, the position data includes an orientation of the wearable device 104 in relation to the base station 108.

FIG. 3 depicts a space 308. The space 308 is an area or a volume of the local map. The space 308 includes features 312, such as surfaces, edges, and/or corners that have been in a field of view of one or more cameras 124 of the wearable device 104. The local map can include relative distances and/or orientations between the features of the local map. In some embodiments, the local map can include orientation data of the wearable device 104 in relation to one or more features 312. For example, a feature 312 can include a corner or a horizontal line formed by an intersection of a wall and a ceiling. The local map could determine orientation of the wearable device 104 relative to the environment based on relative orientation to the corner, horizontal line, vertical line, or some other line of known orientation. In some embodiments, the base station 108 can measure a distance and/or a direction to a feature 312 of the environment. Accordingly, position data can include location data and/or orientation data measured to a feature 312 of the local map. In some embodiments, the distance 304 is measured using an electronic distance measurement (EDM) device.

The Environment 316 is a physical space (e.g., a three dimensional space) and includes physical objects within the physical space. The local map is oriented to the environment 316. Examples of the environment 316 include a building, a floor of a building, a construction site, a road way, a parking lot, a field, a dwelling, an office space, a yard, a room, etc.

While a local map has a given precision, the given precision may not be sufficient for certain applications. For example, if the given precision of the local map is 20 cm and a desired precision for a construction layout is 10 cm or better, then the given precision of the local map is insufficient. Precision of the local map can also degrade over larger areas. For example, precision of the local map degrades as a construction worker walks 20 yards from a first location to a second location. The local map might not keep enough data points to accurately track relative position over the distance of 20 yards. To improve precision and/or accuracy, a robotic total station can be used (e.g., as base station 108) to accurately determine a position of the wearable device 104 within the environment 316. The local map is calibrated to the wearable device 104. By calibrating the local map to the wearable device 104, and the wearable device 104 to the environment 316, the precision and/or accuracy of the local map can be increased.

Points 320 are virtual objects generated by the optical display. The points 320 are generated by the optical display and presented to a user of the wearable device 104 to appear in relation to the environment 316. Accordingly, the points 320 appear to the user to be on a wall in the environment 316, but another person standing next to the user of the wearable device 104 would not see the points 320. Though points 320 are shown as the virtual objects, other virtual objects can be shown. For example rendering of plumbing, HVAC, electrical, structural, and other items could be shown as virtual objects in relation to the environment 316 (e.g., rendering of to-be-built objects).

Figure 4:
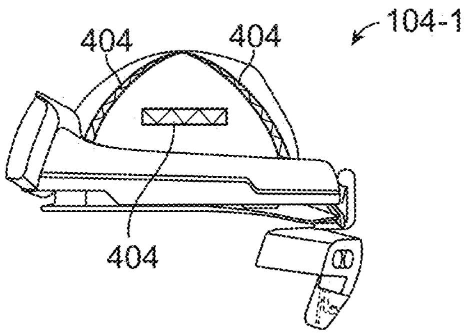
FIGS. 4-6 are further embodiments of a wearable device.
Figure 5:
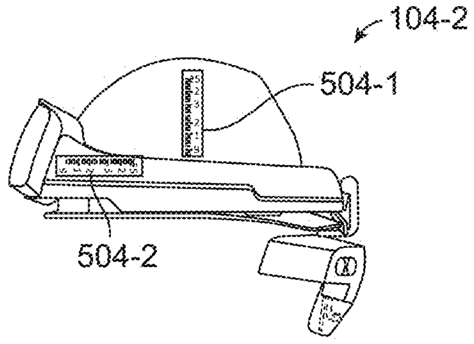
Figure 6:
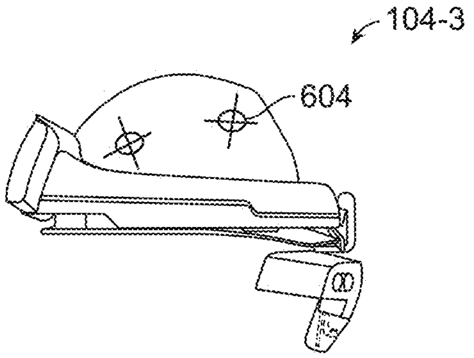

FIGS. 4-6 are further embodiments of a wearable device. FIG. 4 depicts an embodiment of a first wearable device 104-1; FIG. 5 depicts an embodiment of a second wearable device 104-2; FIG. 6 depicts an embodiment of a third wearable device 104-3. An EDM and/or a camera can be used at the base station measure a distance from the base station to the wearable device 104 and/or an orientation of the wearable device. In some embodiments, an EDM is co-centered with a camera at the base station.

In FIG. 4, the first wearable device 104-1 has reflective tape 404. The reflective tape 404 can be retroreflective tape. The reflective tape 404 is placed on the hardhat in a pattern, e.g., a known pattern so that orientation of the hardhat can be determined by an image of the pattern. In some embodiments, the reflective tape 404 is a first reflector in addition to a second reflector on the hardhat (such as the prism shown as reflector 116 in FIG. 2), another piece of reflective tape, or foil. The second reflector can be in a known orientation to the first reflector (e.g., so that an orientation of the first wearable device 104-1 can be determined based on an image of the first reflector, the second reflector, and known relative orientations of the first reflector to the second reflector). The reflective tape 404 is a type of marker.

In FIG. 5, the second wearable device 104-2 has a code 504 on the hardhat. The code 504 is a machine-readable code in the form of a pattern. Examples of code 504 can include a bar code (e.g., a pattern of lines with varying space and/or thicknesses); a Quick Response (QR) code (e.g., a 2D barcode); ruler markings; and two-dimensional patterns, with or without characters. The code 504 is fixedly attached to the hardhat and/or formed in the hardhat (e.g., etched after the hardhat is made, or molded with the hardhat as the hardhat is being made). The code 504 is a type of marker. In one example, a first code 504-1 (e.g., a ruler or a bar code) is orientated vertically on the hardhat, and a second code 504-2 (e.g., a ruler or a bar code) is oriented horizontally on the hardhat. The first code 504-1 and the second code 504-2 have unique markings. A base station images the second wearable device 104-2 and can determine an orientation of the wearable device based on how the first code 504-1 and/or the second code 504-2 face the base station. The base station can also determine a distance from the base station to the wearable device based on known distances between markings of the code 504 imaged on an image sensor.

In FIG. 6, the third wearable device 104-3 has a design 604. The design 604 can be a two-dimensional design or a three dimensional design. For example, the design 604 can be a target covering a portion of an outside surface area of the hardhat (e.g., covering an area equal to or less than 50, 35, 25, 20, 10, or 5 percent and/or covering an area equal to or greater than 5, 10, 15, or 20 percent). In some embodiments, the design 604 could be an artistic design. For example, a design of a flag, animal, dragon, logo, geometric shape, etc. could be used. Similarly as in FIG. 5, dimensions of the design 604 can be known to enable the base station to determine a location and/or orientation of the third wearable device 104-3. The design 604 is a marker.

Figure 7:
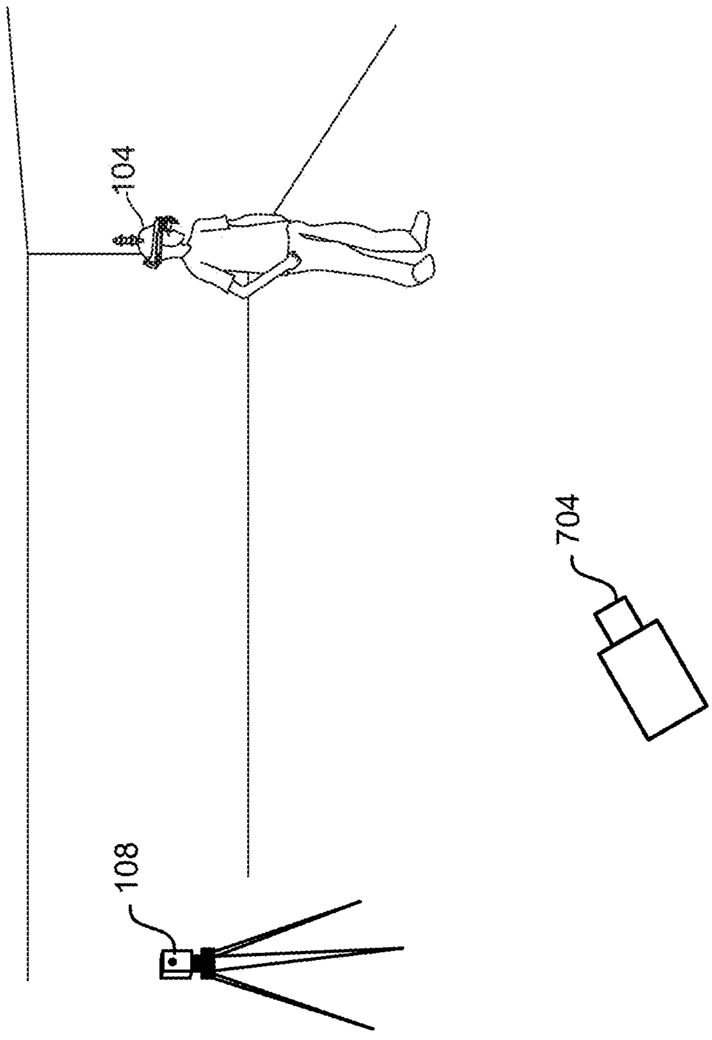
FIG. 7 depicts another embodiment of a system for identifying points of interest during construction layout.

FIG. 7 depicts another embodiment of a system for identifying locations of points of interest during construction layout. The system comprises a camera 704, along with a wearable device 104 and/or a base station 108. The camera 704 is a tracking camera. The camera 704 is separate from the base station 108 and the wearable device 104. In some embodiments, the camera 704 is part of the base station 108. In some embodiments, the camera 704 is part of the wearable device 104 and tracks relative movement between the wearable device 104 and the base station 108 or other feature calibrated to the environment.

The camera 704 acquires image data (e.g., pictures) used to determine a position of the wearable device 104 within the environment. For example, a robotic total station is used as the base station 108. The robotic total station is used to precisely determine a location of the camera 704 in the environment. The camera 704 can be used to track the wearable device 104 as a user moves about the environment. Having the camera 704 separate from the robotic total station can be useful in several situations. For example, the total station might not have line of sight to the wearable device 104, but the camera 704 does (e.g., a feature in the environment, such a as a post, wall, or tree blocks line of sight from the total station to the wearable device 104). In another example, the camera 704 could be placed so that the wearable device 104 is not silhouetted by a relatively bright light source (e.g., a user standing by a window).

Figure 8:
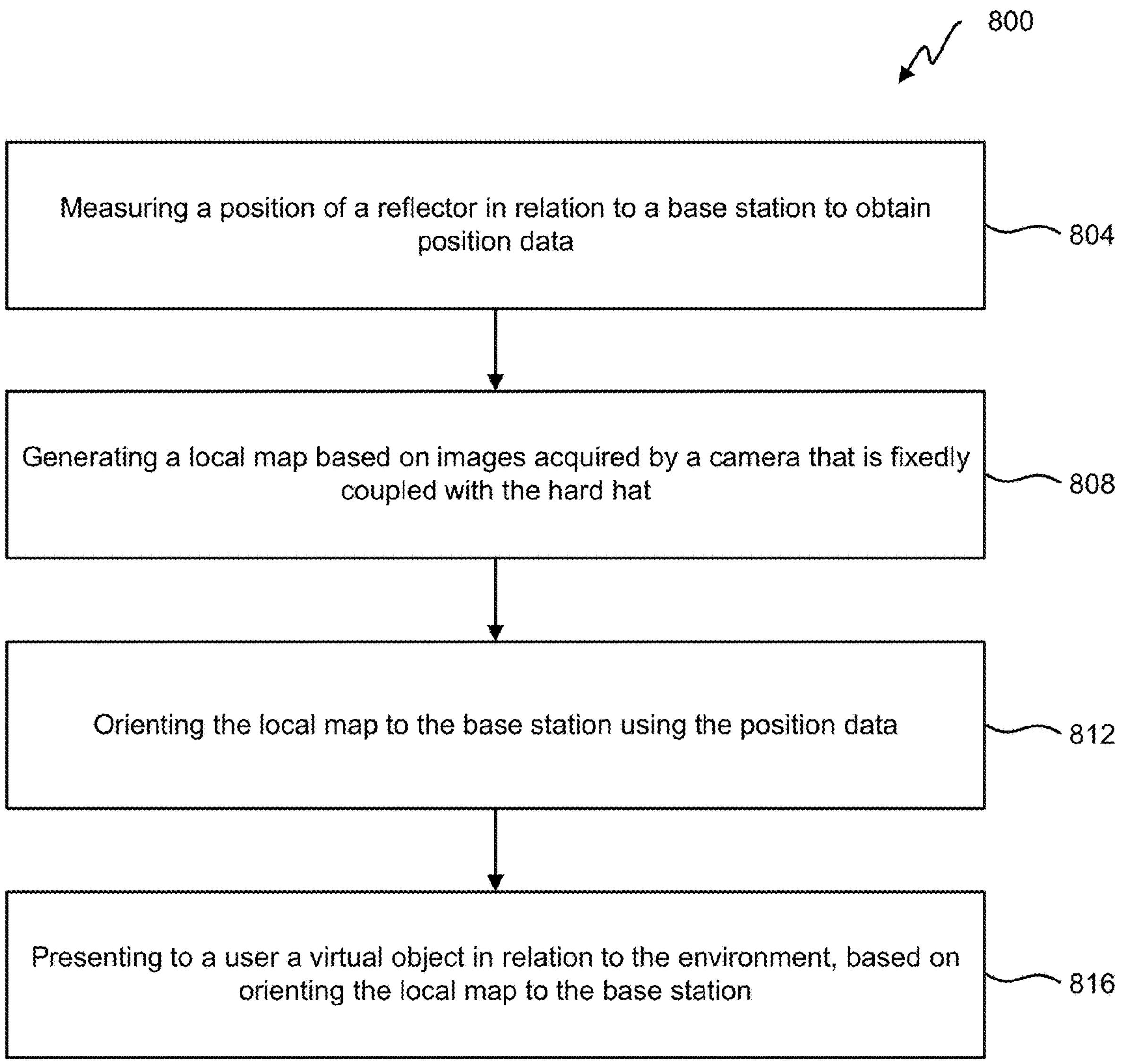
FIG. 8 illustrates a flowchart of an embodiment of a process for using augmented reality during construction layout.

In, FIG. 8, a flowchart of an embodiment of a process 800 for using augmented reality during construction layout is shown. Process 800 begins in step 804 with measuring a position of a reflector in relation to a base station to obtain position data. The reflector is fixedly coupled with a hardhat, and the base station is configured to measure angels and distances from the base station to the reflector in relation to an environment (e.g., as described in conjunction with FIG. 1). In step 808, a local map is generated based on images acquired by a camera that is fixedly coupled with the hardhat. For example, camera 124 of an augmented-reality system acquires images, and a SLAM algorithm is used to create the local map based on the acquired images.

In step 812, the local map is oriented to an environment (e.g., by orienting the local map the base station) using the position data. For example, the base station is oriented to the environment (e.g., by surveying techniques), and the base station measures a distance and/or an angle from the base station to the wearable device (e.g., position data). The local map is created in relation to the wearable device. Accordingly, the local map can be oriented to the environment based on the distance and/or the angle of the wearable device to the base station.

In some embodiments, a model in relation to the environment is saved in one or more memory units of the user device, the base station, a mobile device (e.g., a tablet, laptop, or smartphone) and/or other computing device. The model can contain information, such as points and/or a three-dimensional representation of a change to the environment (e.g., plumbing to be added, a change in grade, framing, finishing, appliances, architecture changes, etc.). The model, or a portion of the model, is presented to the user of the wearable device by the optical display as one or more virtual objects in relation to the environment. The virtual object appears in proper relation to the environment based on orienting the local map of the augmented-reality display with the base station.

The process 800 can include more or fewer steps. For example, process 800 can further include orienting the model to the environment and/or orienting the base station to the environment (e.g., creating a baseline), wherein orienting the model to the environment and/or orienting the base station to the environment can be done before 804. In some embodiments, the base station can be outside of the environment. For example, the base station could be a distance of 10 or 50 yards away from the environment that the user is operating in.

Though construction layout is provided as an example, the example is not meant to be a limiting example, and the system and/or techniques can be used in other applications (e.g., navigation, entertainment, medical, repair, design, modeling, as-built verification, etc.). The system and/or techniques can be used in modeling, such as visualization of new construction. For visualization of new construction, one particularly beneficial application is visualization walk through when there are very little physical features. For example, a home builder could walk a buyer through a virtual home when there is only a foundation of the home constructed. Using traditional SLAM techniques, the local map might have a difficult time orienting to the environment of just a foundation. For example, if a user looked up to "see" where a ceiling was to be placed, the SLAM algorithm may have difficulty identifying features because there could be no physical features present as the user looks at the sky. However, by using the base station to orient the local map to the environment, the augmented-reality display could generate a virtual image of a model of the home to be built in relation to the foundation of the home. The user could switch between different models (e.g., of a home) while standing near or on the foundation (or standing at an empty field).

Figure 9:
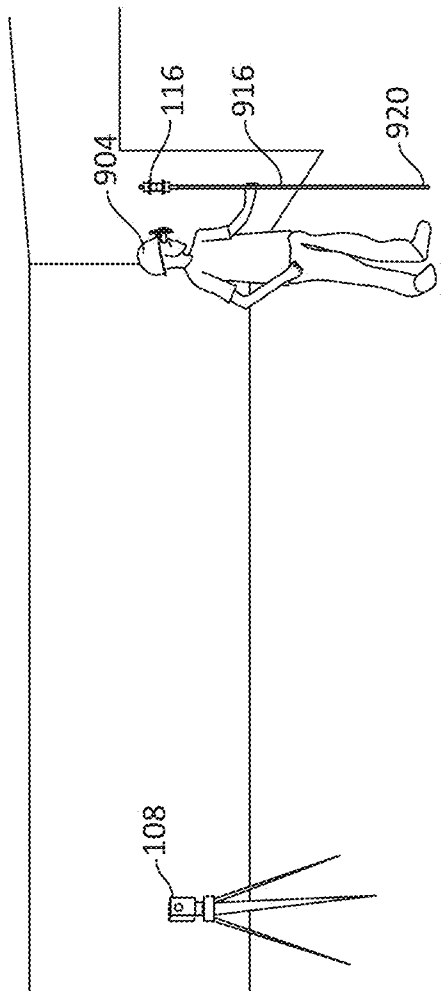
FIG. 9 depicts an embodiment of a system for surveying.

Referring next to FIG. 9 an embodiment of a system for surveying is shown. The system comprises a wearable device 904, a base station 108, and a surveying pole 916. A reflector 116 is coupled with the surveying pole 916.

The wearable device 904 can be similar to the wearable device 104 of FIG. 2 (e.g., the wearable device 904 can comprise one or more cameras 124, an optical display 120, a hardhat 112, a housing 208, a frame, a battery compartment 212, one or more processor, one or more memory devices, and/or an augmented-reality system 128). One difference between the embodiments shown in FIG. 1 and FIG. 9 is that the reflector 116 or design (e.g., 404, 504, and 604 in FIGS. 4-6) in FIG. 9 is coupled with the surveying pole 916 instead of the wearable device 104 in FIGS. 2 and 4-6.

The base station 108 is used as "truth" during surveying while there is a direct line of sight between the reflector 116 and the base station 108. "Truth" refers a reference from which a surveying point is measured relative to. For example, during measurements while there is a direct line of sight between the reflector 116 and the base station 108, survey points are measured with respect to the base station 108, because a distance between the base station 108 and the reflector 116 is measured by the base station 108, and a relative position between the reflector 116 and a tip 920 of the surveying pole 916 is known (or ascertainable).

Sometimes, a line of sight between the base station 108 and the reflector 116 can be blocked. For example, a pillar, a wall, a piece of equipment, or the user can block the line of sight between the base station 108 and the reflector 116. While the line of sight is blocked to the base station 108, some traditional surveying systems cannot continue to perform measurements. In some embodiments, "truth" is transferred from the base station 108 to the wearable device 904 while line of sight between the reflector 116 and the base station 108 is blocked. Thus measurements made while the wearable device 904 is "truth," are made with respect to an offset between the surveying pole 916 and the wearable device 904.

In some embodiments, one or more memory devices containing instructions that, when executed, cause one or more processors to perform the following steps: determining that a surveying pole 916 is out of a line of sight of a base station; generating a local map based on images acquired by the camera; determining an offset of the surveying pole with respect to the local map based on images of the surveying pole acquired by the camera, wherein the offset is determined after determining that the surveying pole is out of the line of sight of the base station; and/or measuring a location of a point based on the offset of the surveying pole with respect to the wearable device. The base station 108 can be configured to not move location relative to the environment during measurements.

Figure 10:
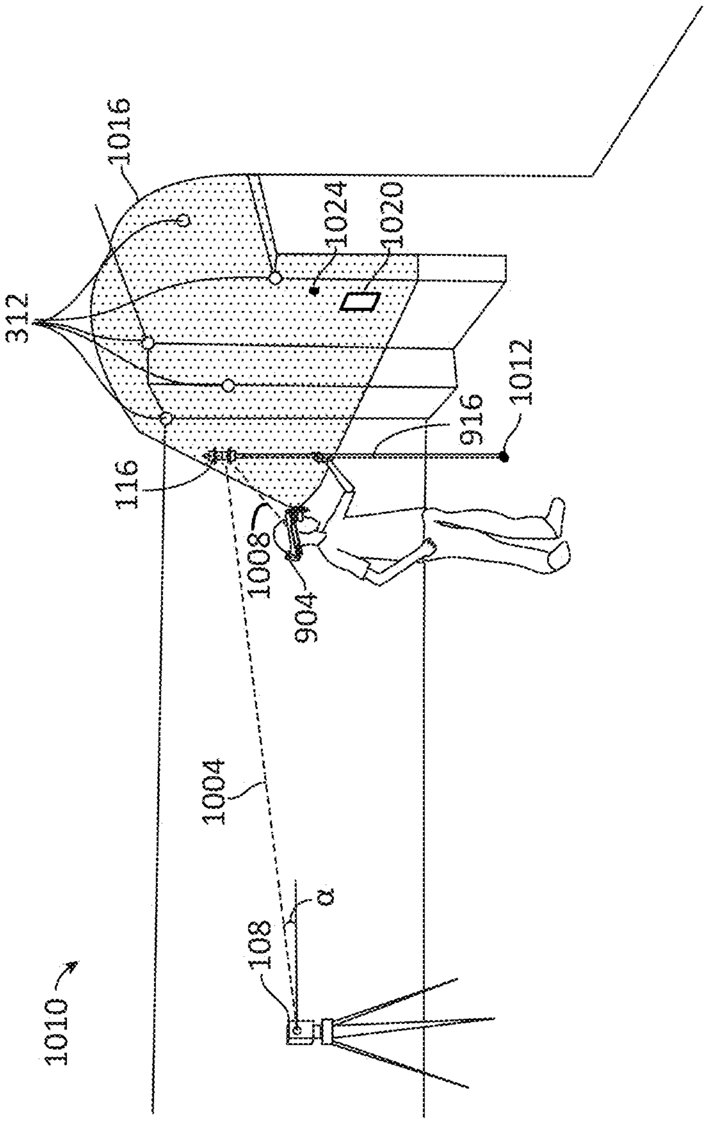
FIG. 10 is a simplified example of a relationship between position data and an offset between a reflector and a wearable device.

FIG. 10 is a simplified example of a relationship between a distance 1004 between the reflector 116 and the base station 108 and an offset 1008 between the reflector 116 and a wearable device 904. The offset 1008 is a distance between the wearable device and the surveying pole 916 (e.g., measured from the reflector 116 to the wearable device 904 by the wearable device 904 using an augmented-reality system of the wearable device 904). The offset 1008 can be measured using an algorithm of the wearable device 904 (e.g., a SLAM algorithm).

The base station 108 is oriented with an environment 1010 (e.g., using surveying techniques to place a robotic total station at a construction site) to calibrate the base station 108 with respect to the environment 1010. A position of the surveying pole 916 is determined with respect to the base station 108 by measuring a distance 1004 between the base station 108 and the reflector 116 and/or measuring one or more angles (e.g., measuring an angle $\alpha$) between the base station 108 and the reflector 116. The distance 1004 and/or the one or more angles can be used to measure a point 1012 with respect to the base station 108.

A local map of a space 1016 can be generated by images from one or more cameras of an augmented-reality system of the wearable device 904. The space 1016 includes features 312 and the reflector 116. The local map includes relative orientation of the reflector 116 with respect the wearable device and the offset 1008. By using the relative orientation of the reflector 116 with respect to the wearable device, the offset 1008, the distance 1004, and/or the one or more angles (e.g., angle $\alpha$), the local map can be calibrated to the environment 1010.

In some embodiments, the wearable device 904 can be used to calibrate the base station 108 to the environment 1010. For example, the wearable device 904 can be used to read a machine-readable code 1020 or identify a particular feature with known coordinates of the environment 1010. The wearable device 904 can determine a position of the machine-readable code 1020 and relative orientation of the machine-readable code in relation to the wearable device 904. The wearable device 904 is also used to measure the offset 1008 and/or relative orientation of the reflector 116. The base station 108 measures the distance 1004 and/or one or more angles from the base station to the reflector 116. The base station 108 can be calibrated to the environment 1010 based on the known coordinates of the machine-readable code 1020, the relative position of the readable code in relation to the wearable device 904, the offset 1008 and relative position of the reflector 116 in relation to the wearable device 904, the distance 1004, and/or the one or more angles measured from the base station 108 to the reflector 116. The wearable device 904 can be used to read and/or transmit data of the machine-readable code 1020 to the base station 108. Thus the wearable device 904 can be used to help in setting up the base station 108.

A virtual object 1024 can be shown to a user of the wearable device 904 in relation to the environment 1010. For example, virtual object 1024 does not exist, but appears to the user to be on the wall above the machine-readable code 1020.

Figure 11:
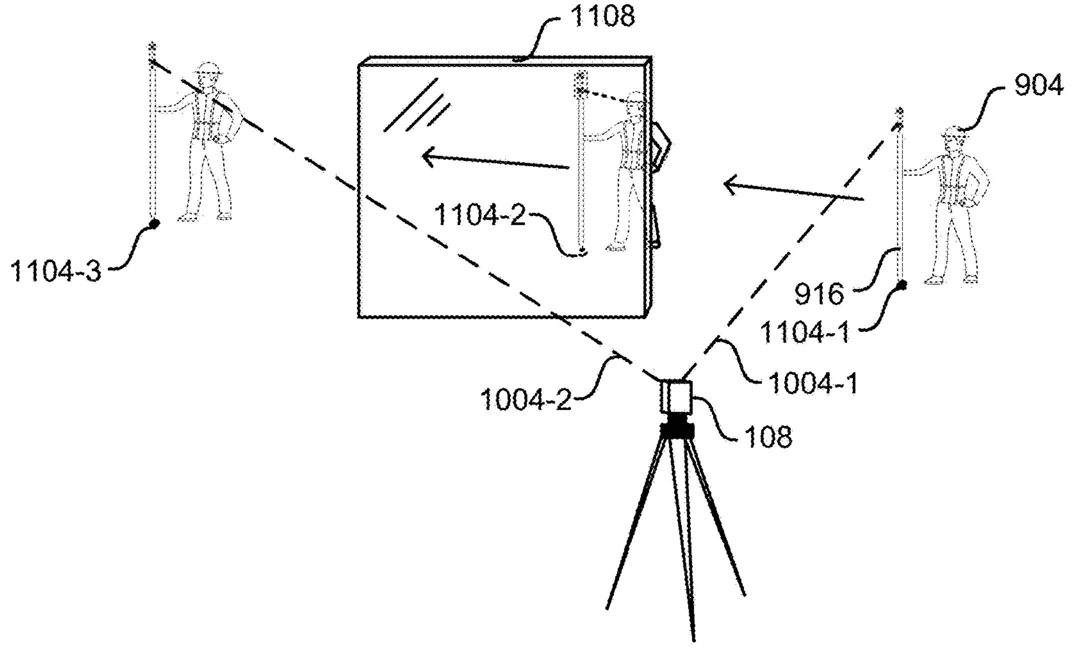
FIG. 11 displays a simplified diagram of line of sight to a base station being blocked.

FIG. 11 displays a simplified diagram of transferring truth from a surveying pole 916 to a wearable device 904 while line of sight to the base station 108 is blocked. FIG. 11 depicts a user making three different measurements of three different points at three different times. At a first time, the surveying pole 916 is that a first point 1104-1; at a second time, the surveying pole 916 is at a second point 1104-2; and at a third time, the surveying pole 916 is at a third point 1104-3. The user moves the surveying pole 916 from the first point 1104-1 to the second point 1104-2, and from the second point 1104-2 to the third point 1104-3.

The base station 108 has line of sight with the surveying pole 916 while a tip of the surveying pole 916 is placed at the first point 1104-1 and while the tip of surveying pole 916 is placed at the third point 1104-3. However, an obstruction 1108 blocks line of sight from the base station 108 to the surveying pole 916 while the tip of the surveying pole 916 is at the second point 1104-2. The base station 108 is used as truth for measuring the first point 1104-1 and the third point 1104-3; the wearable device 904 is used as truth for measuring the second point 1104-2. Measurements using the base station 108 often have higher precision than measurements using the wearable device 904. Accordingly, the base station 108 is used as truth while there is line of sight between the base station 108 and the surveying pole 916, though measurements using the wearable device 904 as truth could be performed in situations with more relaxed precision tolerances.

The following is an example of taking measurements while transferring truth from the base station 108 to the wearable device 904 and then back to the base station 108. A user calibrates the base station 108 with an environment and calibrates a local map of the wearable device 904 to the environment (e.g., as described in FIG. 10). The user places the tip of the surveying pole 916 at the first point 1104-1. The distance between the tip of the surveying pole 916 and the reflector is known. The base station 108 measures a first distance 1004-1 from the base station 108 to the reflector of the surveying pole 916 and/or relative angles between the base station 108 and the surveying pole 916. The location of the first point 1104-1 is measured based on the first distance 1004-1 and/or relative angles between the base station 108 and the surveying pole 916 (i.e., the base station 108 is used as truth for measuring the location of the first point 1104-1).

The user moves the surveying pole 916 from the first point 1104-1 to the second point 1104-2. As the user moves the surveying pole to the second point 1104-2, the obstruction 1108 blocks line of sight of the base station 108 to the surveying pole 916. The surveying pole 916 can be determined to be out of the line of sight of the base station 108 in various ways. For example, the base station 108 could determine that the base station 108 is no longer tracking a part of the surveying pole (e.g., reflector) and/or send a wireless signal to the wearable device 904. In another example, a reflector coupled with the surveying pole could detect light received from the base station 108 (e.g., the reflector can detect light from an EDM of the base station 108), and when the reflector no longer detects light received from the base station 108, the reflector could activate a signal (e.g., activating a light source having a particular wavelength and/or duty cycle, such as a red LED flashing two times per second). The wearable device 904 could identify the signal and ascertain that the base station 108 is no longer in line of sight with the surveying pole 916.

After determining that the base station 108 is no longer in line of sight with the surveying pole 916, an offset of the surveying pole 916 with respect to the local map of the wearable device 904 (e.g., an offset as 1008 and/or relative position of the reflector 116 with respect to the wearable device 904 as described in FIG. 10) is determined (e.g., ascertained), based on images acquired by one or more cameras of the wearable device 904. A location of the second point 1104-2 is measured based on the offset of the surveying pole with respect to the wearable device (i.e., the wearable device 904 is used as truth for measuring the location of the second point 1104-2). Since the wearable device 904 is used as truth to measure the location of the second point 1104-2 with respect to the environment, truth is said to be transferred from the base station 108 to the wearable device 904.

As the user walks from the second point 1104-2 to the third point 1104-3, truth is transferred from the wearable device 904 to the base station 108 as the surveying pole 916 comes into line of sight of the base station 108. The user places a tip of the surveying pole 916 at the third point 1104-3. The base station 108 measures a second distance 1004-2 from the base station 108 to the surveying pole 916 and/or relative angles from the base station 108 to the surveying pole 916. The location of the third point 1104-3 is measured based on the second distance 1004-2 and/or relative angles between the base station 108 and the surveying pole 916 (i.e., the base station 108 is used as truth for measuring the location of the third point 1104-3).

Transferring truth from the base station 108 to the wearable device 904 can also be done in conjunction with other embodiments disclosed herein. For example, in the embodiment in FIG. 3, if a line of sight between the base station 108 and the wearable device 104 were blocked, truth could be transferred to the wearable device 104 for the user to continue to take measurements.

Measurements using the base station 108 as truth are generally more precise than measurements using the wearable device 904 as truth. One reason the wearable device 904 may not have as precise measurements is because a calculation of relative position of the wearable device 904 to the environment 1010 can drift, or accumulate errors, over time. Thus is can be preferred to use the base station 108 as truth for higher-precision applications. In some embodiments, the optical display 120 can show cumulative error while the wearable device 904 is used as truth (the optical display 120 can also show estimated error while the base station 108 is used as truth).

The wearable device 904 can be used to help the base station 108 track the surveying pole 916. A robotic total station can be configured to track a reflector. However, if line of sight between the robotic total station and the reflector is obscured, then the robotic total station implements an algorithm for acquiring the reflector. Some algorithms include waiting for a certain amount of time and then entering a search routine where the robotic total station scans the environment searching for the reflector (e.g., a raster-type scan or circular scan). Scanning the environment searching for the reflector can take time away from making measurements using the robotic total station.

The wearable device 904 can be used to help the base station 108 more quickly acquire tracking the reflector after the reflector is obscured from a line of sight of the base station 108. For example, the wearable device 904 measures a relative position of the reflector of the surveying pole 916 with respect to the wearable device 904. As the user moves from the first point 1104-1 to the second point 1104-2, the obstruction 1108 blocks line of sight between the base station 108 and the surveying pole 916, and truth is transferred from the base station 108 to the wearable device 904. The wearable device 904 can calculate a position of the surveying pole 916 in relation to the environment based on the relative position of the reflector with respect to the wearable device 904. The wearable device 904, or some other device such as a smart phone or a tablet, can transmit the position of the surveying pole 916 in relation to the environment to the base station 108. Thus the base station 108 can orient itself to be ready to acquire tracking of the surveying pole 916 has a user emerges from behind the obstruction 1108 on the way to the third point 1104-3. Without receiving information about the position of the surveying pole 916 in relation to the environment, the base station 108 would not know if the surveying pole 916 is going to emerge to the left, right, up, down, etc. of the obstruction 1108. By sending data about the position of the surveying pole 916 in relation to the environment, the base station 108 can be prepared to acquire the reflector of the surveying pole 916 as the user emerges from behind the obstruction 1108. In some embodiments, position data of the surveying pole 916 (and/or reflector or other target) is sent periodically to the base station 108 (e.g., once every 0.25, 0.5, 1, 2, 5, or 10 seconds).

Figure 12:
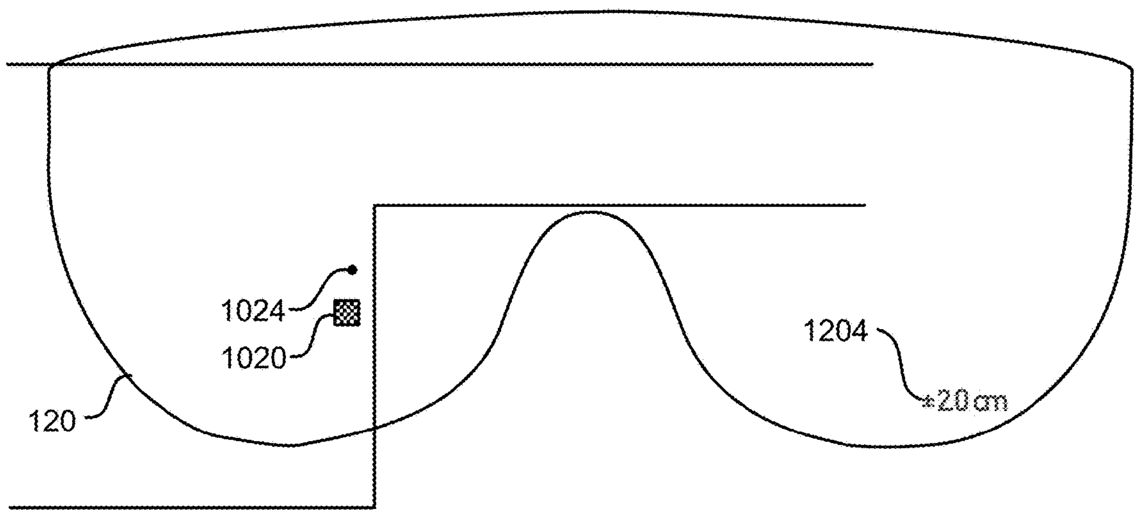
FIG. 12 is an embodiment of displaying cumulative error to a user while line of sight is blocked to a base station.

FIG. 12 is an embodiment of displaying estimated error. Estimated error is shown to a user while line of sight is blocked to the base station. In FIG. 12, an embodiment of a user perspective of the environment 1010 in FIG. 10 through the optical display 120 is shown. The optical display 120 comprises text 1204. The text 1204 indicates the estimated error. An error while using the base station can be relatively low (e.g., equal to or less than 1, 2, 5, or 10 mm). After truth is transferred from the base station 108 to the wearable device 904, cumulative error can increase as sensors drift. As cumulative error increases, the text 1204 can change to indicate increased error in making measurements. For example, the text in FIG. 12 shows "±2.0 cm" to indicate to the user that measurements being made have accuracy likely no better than 2 centimeters. The estimated error can increase to a threshold value. After the estimated error reaches or exceeds the threshold value, the wearable device can be configured to stop making measurements. In some embodiments, the threshold value can be set by the user or an administrator (e.g., the threshold value is set by a foreman to verify accuracy of measurements being made).

Truth changing from the base station to the wearable device can be communicated to the user in various ways. For example, an icon of a base station can be shown to the user by the optical display 120 (e.g., near text 1204) to indicate the base station is being used as truth; and an icon of a wearable device can be shown to the user by the optical display 120 to indicate the wearable device is being used as truth. In another example, color of the text 1204 is changed (e.g., green for the base station as truth and red for the wearable device as truth). In a further example, the wearable device can display error bounds as a circle, dot, or target to the user at the point being measured. The examples above are not limiting or mutually exclusive, and examples can be combined in various ways.

Figure 13:
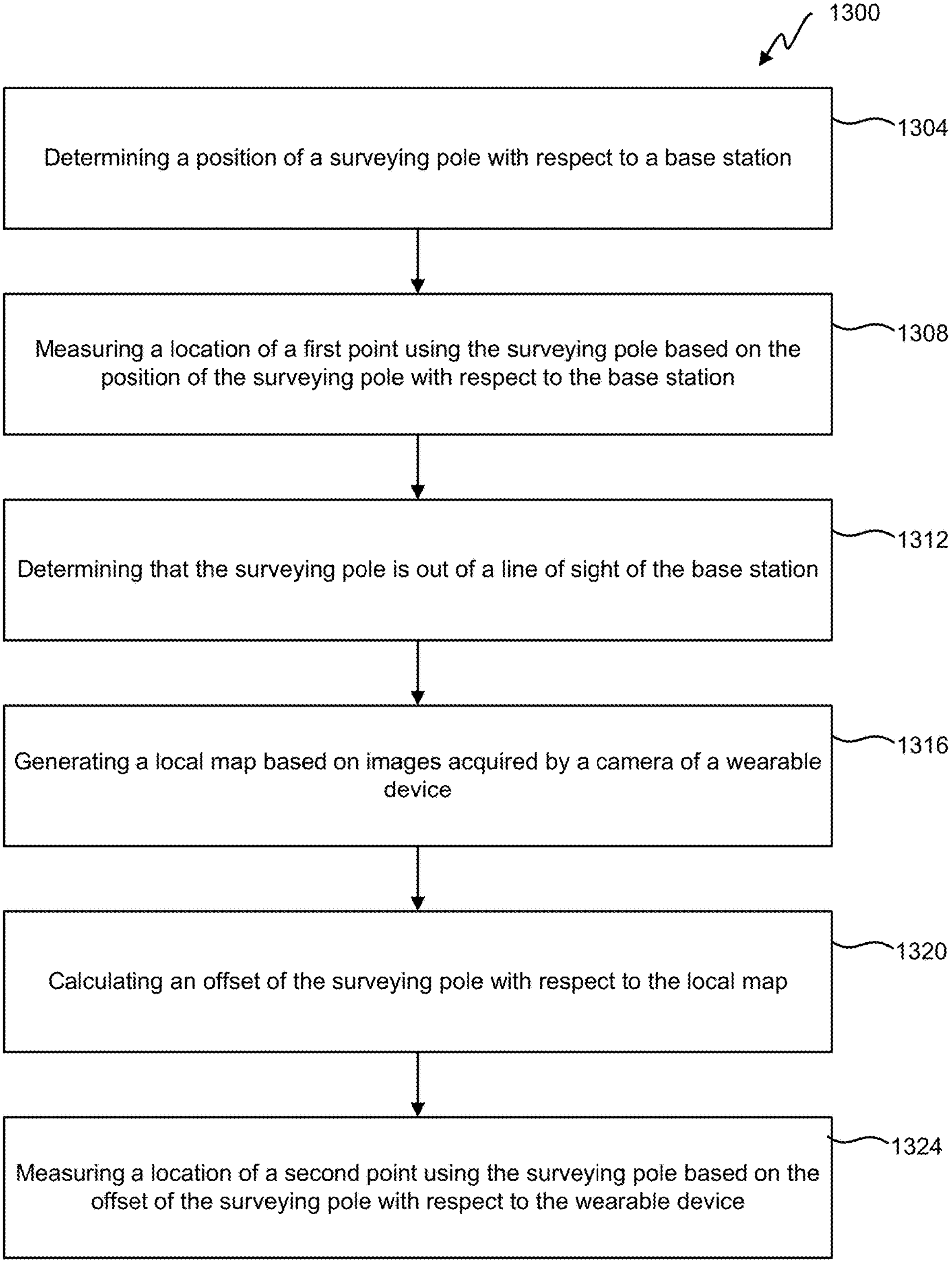
FIG. 13 illustrates a flowchart of an embodiment of a process for switching truth from a surveying pole to a wearable display.

FIG. 13 illustrates a flowchart of an embodiment of a process 1300 for switching truth from a surveying pole to a wearable display. Process 1300 begins in step 1304 with determining a position of a surveying pole with respect to a base station, wherein a location of the base station is calibrated with respect to an environment. For example, a location of the base station is calibrated with respect to the environment 1010, and the distance 1004 and/or angles (e.g., angle $\alpha$) are measured between the base station 108 and the reflector 116, as described in conjunction with FIG. 10.

A location of a first point using the surveying pole is measured based on the position of the surveying pole with respect to the base station, step 1308. For example, the location of the first point 1104-1 is measured with respect to the base station 108 in FIG. 11.

In step 1312, a determination is made that the surveying pole is out of a line of sight of the base station. For example, the user in FIG. 11 moves the surveying pole 916 behind the obstruction 1108, and the base station 108 and/or the wearable device 904 determine there is no longer a line of sight between the base station 108 and the surveying pole 916.

A local map is generated based on images acquired by a camera of the wearable device 904, step 1316. For example, one or more cameras of wearable device 904 in FIG. 11 are used to generate a local map, which could include features of the obstruction 1108. The local map can be oriented to the environment while there is a line of sight between the survey pole 916 and the base station 108.

In step 1320, an offset of the surveying pole with respect to the local map is calculated based on images of the surveying pole acquired by the camera. The surveying pole can move independently from the camera of the wearable device, and/or the offset is determined after determining that the surveying pole is out of the line of sight of the base station.

A location of a second point using the surveying pole is measured based on the offset of the surveying pole with respect to the wearable device. For example, the wearable device 904 in FIG. 11 is used as truth for measuring the second point 1104-2. Truth can be switched back to the base station. For example, as the user emerges from the obstruction 1108 and measures the third point 1104-3, in FIG. 11, the base station 108 is used as truth because there is a line of sight between the surveying pole 916 and the base station 108 while the surveying pole 916 is at the third point 1104-3.

In some embodiments, the method comprises calibrating a location of the base station with respect to the environment. For example, the base station 108 in FIG. 10 is calibrated to the environment 1010 before measurements are made using the base station 108. The offset can be a second offset (e.g., an offset of the surveying pole 916 with respect to the wearable device 904 while the surveying pole 916 is at the second point 1104-2 in FIG. 11), and the method can further comprise determining a first offset of the surveying pole with respect to the local map based on images of the surveying pole acquired by the camera; the first offset is determined before determining that the surveying pole is out of the line of sight of the base station; and/or orienting the local map to the environment based on the position of the surveying pole with respect to the base station and the first offset of the surveying pole with respect to the local map. For example, the first offset can be between the surveying pole 916 and the wearable device 904 while the surveying pole 916 is at the first point 1104-1 in FIG. 11; and the local map is oriented to the environment based on the first offset and the first distance 1004-1

Errors (e.g., cumulative errors) can be calculated over a duration of time while the surveying pole is out of line of sight of the base station. For example, while the surveying pole 916 is behind the obstruction 1108, cumulative errors are calculated. The wearable device can determine the cumulative errors have exceeded a threshold value. For example, 10 cm could be a threshold value, and the wearable device could ascertain that the error exceeds 10 cm by comparing the cumulative error to the threshold value. The wearable device can indicate to a user that the error has exceeded the threshold value. For example, the text 1204 in FIG. 12 could start blinking the threshold value after the threshold value has been exceeded, and/or an error message could be displayed using the optical display 120.

Coordinates of the surveying pole with respect to the environment can be estimated, based on images from the camera while the surveying pole is out of line of sight of the base station, and/or estimated coordinates of the surveying pole can be sent to the base station. For example, while the surveying pole 916 is behind the obstruction 1108 in FIG. 11, the wearable device can estimate a position of the surveying pole 916 and/or transmit estimated position(s) of the surveying pole 916 to the base station 108. The base station 108 can continue to aim at the estimated position of the surveying pole 916 to more quickly acquire the surveying pole 916 as the surveying pole 916 emerges from the obstruction 1108.

Figure 14:
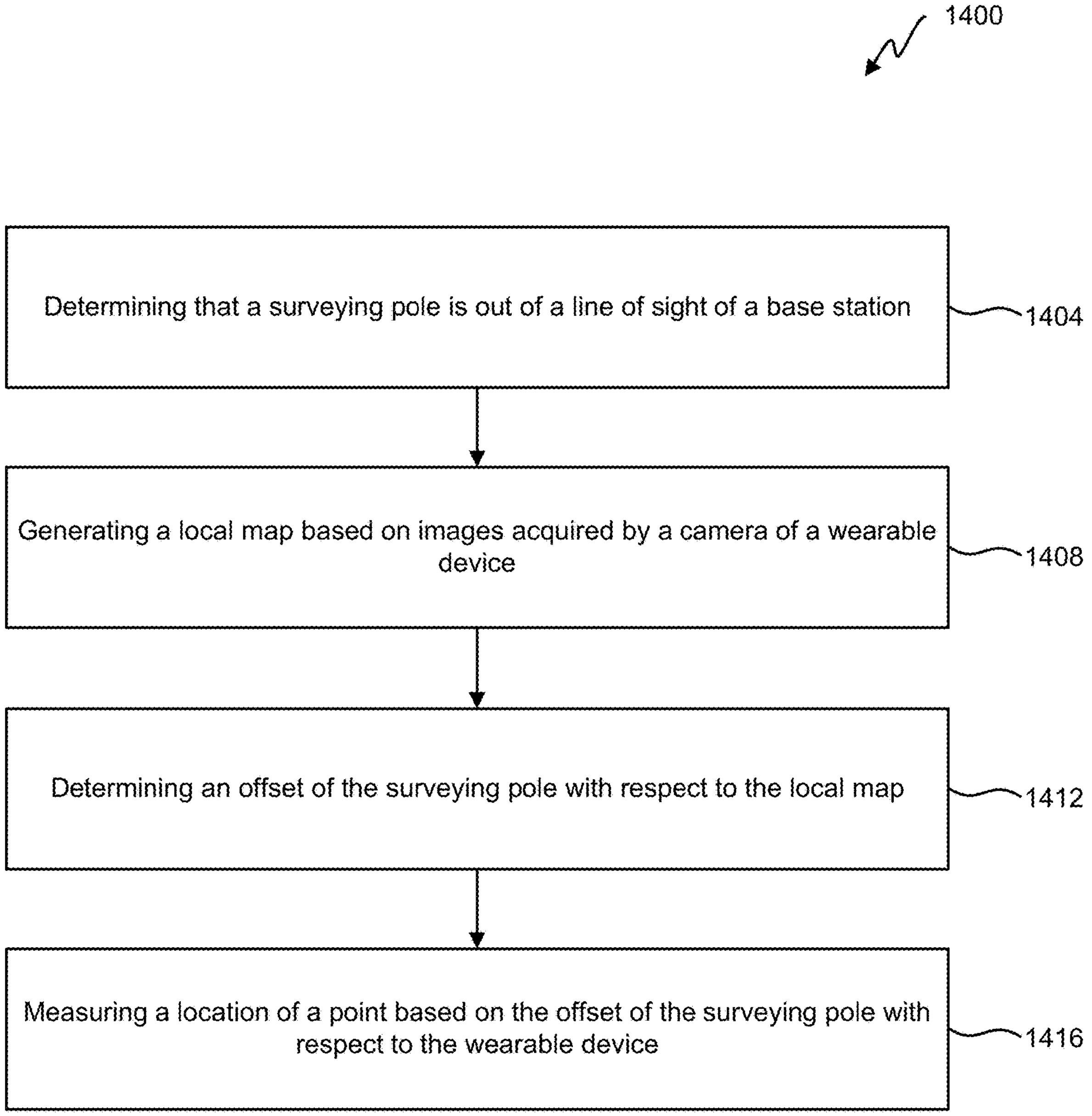
FIG. 14 illustrates a flowchart of an embodiment of a process for using a wearable display as truth for surveying.

FIG. 14 illustrates a flowchart of an embodiment of a process 1400 for using a wearable display as truth for surveying. Process 1400 begins in step 1404 with determining that a surveying pole is out of a line of sight of a base station. A local map is generated using a wearable device (e.g., wearable device 904 in FIG. 11) based on images acquired by one or more cameras of the wearable device, step 1408. In step 1412, an offset of the surveying pole with respect to the local map is determined based on images of the surveying pole acquired by the one or more cameras of the wearable device. The offset is determined after determining that the surveying pole is out of the line of sight of the base station. A location of a point is measured (e.g., the second point 1104-2) based on the offset of the surveying pole with respect to the wearable device, step 1416.

In some embodiments, the wearable device can assist the base station. For example, the wearable device 904 in FIG. 10 can help the base station 108 scan a surface by providing information about the surface from the local map. For example, the base station can be configured to shine a laser spot on a surface (e.g., for marking a place for an anchor point). However, if the surface is not where expected (e.g., the surface is an inch higher than planned) and/or the surface is not smooth (e.g., the surface is undulated), then the base station can have difficulty marking the surface with the laser spot. Yet using information from the local map on surface shape, the base station can predict a better starting point to shine the laser.

In other examples of the wearable device assisting in construction, the wearable device can be used to confirm a model and/or shape of the reflector. Sometimes a user selects a wrong model of reflector used for measurement, which can cause measurement errors. The wearable device can acquire one or more images of the reflector and confirm the correct reflector (e.g., model, size, shape, orientation, etc.) is being used for calculations. The wearable device can provide as-built verification of a construction site by recording images. Images for as-built verification can be logged by date/time (e.g., to log a time when a task is completed), and/or images can be identified by location and/or orientation based on recorded location and/or orientation of the wearable device.

Images for as-built verification can also be used to identify differences between a model and actual completion. The wearable device can confirm a correct object and/or identify an object to be used. For example, if a user holds a 2 inch anchor where a 2.5 inch anchor is to be installed, the wearable device can alert the user and/or identify the correct 2.5 inch anchor in a bin (e.g., "ERROR" is displayed on the optical display 120 in FIG. 12, the 2 inch anchor is highlighted in red, and/or the 2.5 inch anchor is highlighted in green (or an arrow is displayed to indicate the user is to turn his head to find the correct anchor).

In another example, the wearable display can be used to find objects. For example, the wearable device logs locations of tools. The user could ask a digital assistant, "where is my hammer?" The optical display could then indicate an arrow for a direction for the user to turn and/or highlight a location of the hammer, even if the hammer was obscured (e.g., by a board the user placed on top of the hammer).

The wearable device can access a catalog of objects to help the user identify a correct object for a given purpose or given location. In some embodiments, the wearable device highlights a next object for use in a project. For example, if a user is building a shed from a kit, the wearable device could highlight the next board to be used, the next brace to be used, and/or a virtual image of the location/orientation of the board and brace in relation to a floor already assembled (e.g., to speed assembly of the shed).

In some embodiments, a method comprises generating a local map of a space based on images acquired by a camera of a wearable device, wherein the local map includes surface information of an area in the space; transmitting the surface information of the area to a base station; calculating a starting point in the area to direct a laser based on the surface information; receiving an identifier of a reflector to be used; acquiring one or more images of the reflector; comparing the identifier of the reflector to the one or more images of the reflector to confirm the correct reflector is being used; recording images of the environment; providing as-built verification based on recorded images (e.g., identifying differences between a virtual model and actual objects in an image; log time, position, and/or view when complete; etc.); confirming a correct object is installed at a location (e.g., a correct size of hardware, such as a bolt of the correct length can be confirmed to be installed at a specific location); and/or identifying an object; highlighting the object using the display; and/or identifying a next object for a user to touch or pick up.

Figure 15:
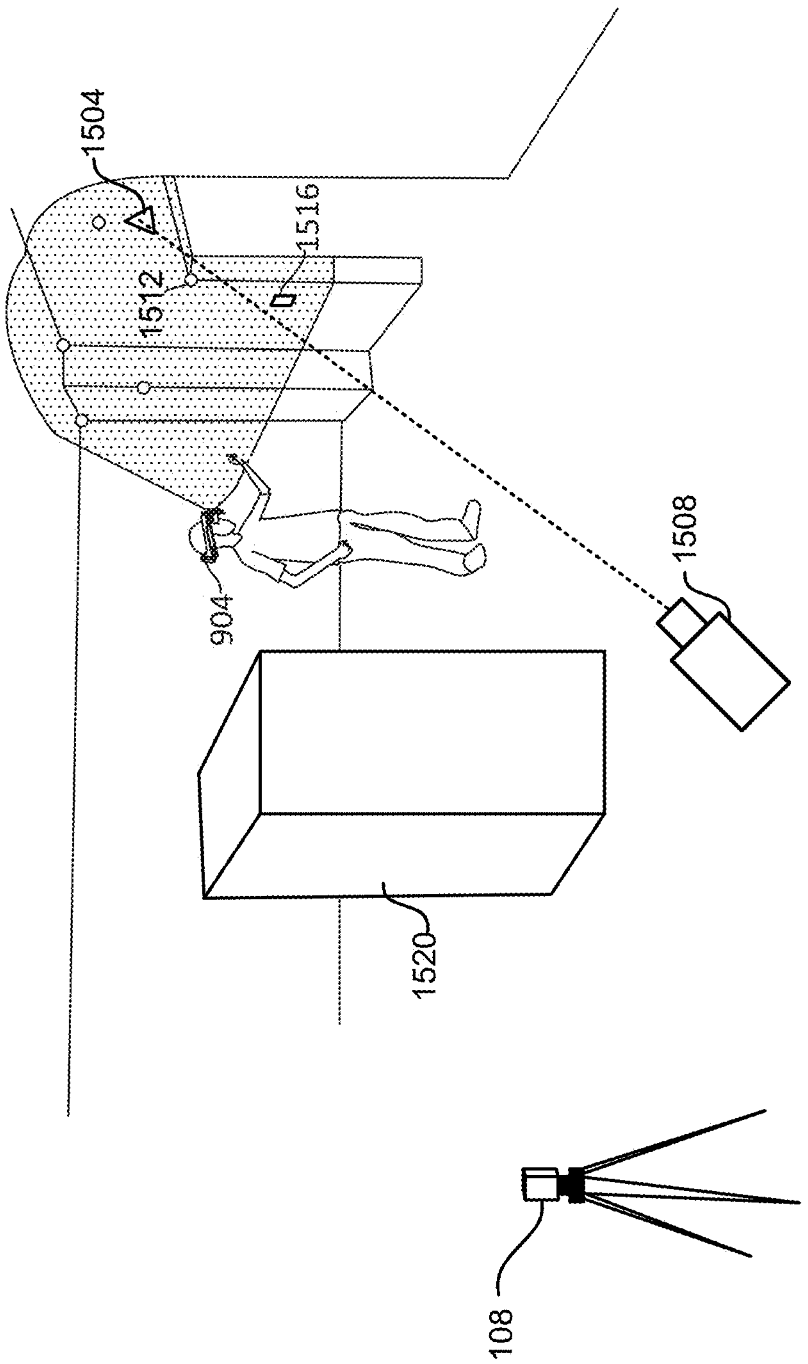
FIG. 15 is a simplified example of using a target on a surface as truth for measurements.

FIG. 15 is a simplified example of an embodiment using a target 1504 on a surface as truth for measurements. A system comprises a light source 1508 and a wearable device 904. The wearable device 904 comprises a camera and an optical display (e.g., a camera and an optical display as part of an augmented-reality system). The light source 1508 is configured to direct light to form the target 1504 on a surface (e.g., on a wall, floor, ceiling, pillar, etc.). The light source 1508 can comprise a laser (e.g., coherent light) and/or a projector (e.g., an incoherent light source and a mask). The light source 1508 can be part of a base station 108 or separate from the base station 108. In the example shown in FIG. 15, the light source 1508 is separate from the base station 108. In some embodiments, the light source 1508 is a laser that is part of a robotic total station.

One or more processors (e.g., a part of the wearable device 904, the light source 1508, and/or the base station 108) are used to measure a relative location of the target 1504 to the base station 108 (e.g., using the base station 108); generate a local map based on a plurality of images acquired by the camera (e.g., of the wearable device 904), wherein the local map includes a relative location of the target 1504 to the wearable device 904; and/or orient the local map to an environment of the base station 108 based on the relative location of the target 1504 to the base station 108, the relative location of the target 1504 to the wearable device 904, and/or a relative location of the base station 108 to the environment. A display (e.g., display 120 in FIG. 12) of the wearable device 904 can present a virtual object (e.g., virtual object 1024) in relation to the environment based on orienting the local map of the wearable device 904 with the environment. In some embodiments, the wearable device 904 is used to measure one or more coordinates of a physical object based on orienting the local map of the wearable device 904 with the environment. For example, the wearable device 904 could be used to measure coordinates and/or orientation of the machine-readable code 1020 in FIG. 12.

By using the target 1504 as truth, virtual objects can be shown to a user, and/or measurements can be made, in relation to the environment. Though the target 1504 has been described as formed by light, other targets could be used. For example, a feature in the environment could be used as a target. An example of a feature could be corner 1512. The base station 108 measures relative position of the feature (e.g., corner 1512) in relation to the base station 108. The wearable device 904 measures relative position of the wearable device 904 in relation to the feature (e.g., corner 1512), and can orient the local map in relation to the environment based on the relation of the wearable device 904 to the feature and the relation of the feature to the base station 108.

In another example, the base station 108 itself can be used as a target. The wearable device 904 measures a relative position of the wearable device 904 in relation to the base station 108, and orients the local map of the wearable device 904 to the environment based on the relation of the base station 108 to the wearable device 904. In some embodiments, the wearable device 904 has one or more cameras positioned to look to a side, a back, and/or above a user to track one or more targets 1504. For example, the wearable device 904 can have a camera positioned to look behind a user to image the base station 108 while the user is looking away from the base station 108, and/or the wearable device 904 can have a camera look "up" to view a target on a ceiling.

In some embodiments, a reflector is placed on the light source 1508 and/or other locations in the environment. Reflector on the light source 1508 can aid in determining a relative position of the light source 1508 with respect to the base station 108. A reflector could be placed on a stand (e.g., a tripod) and placed in a position within line of sight of both the base station 108 and the wearable device 904, wherein the reflector is used as a target for orienting the local map of the wearable device 904 with the environment. Multiple, uniquely-identifiable targets can be placed within an environment to provide a user redundancy and/or availability of targets in an environment having several obstructions 1520. If a target (e.g., target 1504) is not within a field of view of a camera of the wearable device 904, then truth can be transferred to the wearable device 904 (e.g., as discussed in relation to FIGS. 11-13, wherein the reflector on the surveying pole 916 can be considered a target).

In some embodiments, a target (e.g., target 1504) that is separate from the base station 108 is used because the base station 108 might not be in line of sight with the wearable device 904 (e.g., because of obstruction 1520), and/or the base station 108 might be too far away for a camera of the wearable device 904 to adequately image the base station 108. For example, the camera of the wearable device 904 has a wide field of view, which can make objects at a distance (e.g., physical objects at a distance equal to or greater than 3, 5, 10, 15, or more meters away) challenging to accurately position in relation to the wearable device 904.

Figure 16:
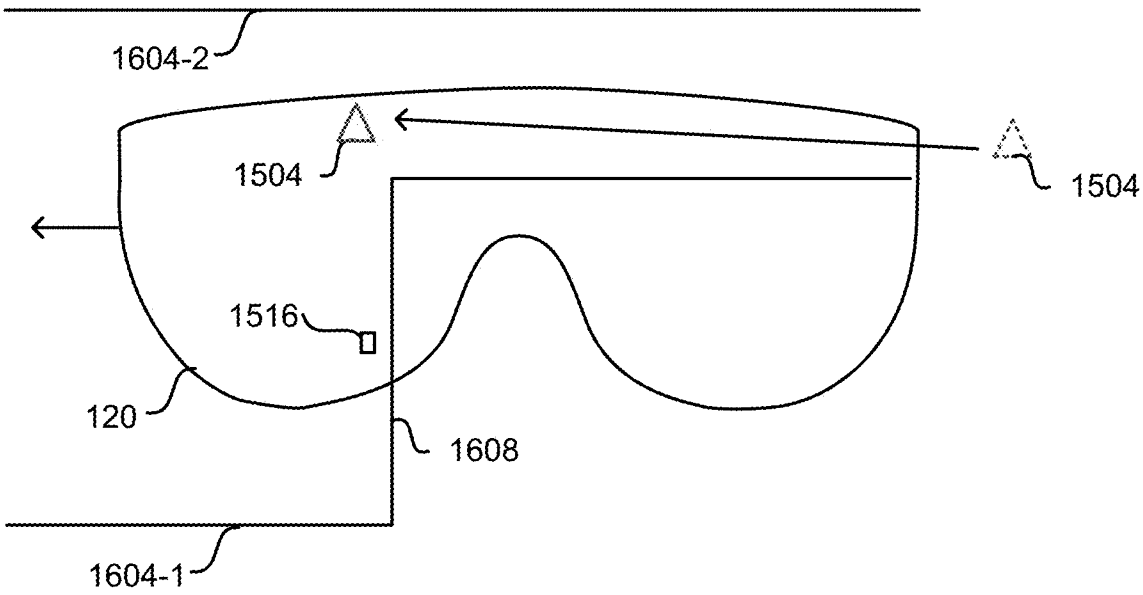
FIG. 16 is an embodiment of a movable design on a surface used as a target for truth.

FIG. 16 is an embodiment of a movable design on a surface used as a target 1504 for truth. In FIG. 16, an embodiment of a user perspective of an environment through an optical display 120 is shown. As the optical display 120 is moved from right to left (e.g., a user turning his head to look left), the target 1504 is moved from right to left (e.g., to stay within a field of view of the user). In some embodiments, eye-tracking data is obtained (e.g., using an eye-tracking capabilities of an augmented-reality system of the wearable device 904) to determine where a user is looking.

The eye-tracking data can be transmitted from the wearable device to the base station and/or the light source. The light source moves the target 1504 to stay within a field of view of the user based on the eye-tracking data. Thus one or more processors can be configured to track an eye of the user, and move a position of the target 1504 based on tracking the eye of the user.

In some embodiments, movement of the wearable device is tracked (e.g., by image data and/or IMU data), and one or more processors are configured to move a position of the target 1504 in response to movement of the wearable device (e.g., translation or rotation of the wearable device could result in translation of the target 1504).

In some instances, the target 1504 cannot be moved to stay within a field of view of the user. In such instances, truth can be transferred from the target 1504 to the wearable device (e.g., similarly as discussed in the description of FIGS. 11-13).

The target 1504 is characterized by a design. The design can be as simple as a dot (e.g., a laser dot from a robotic total station). The design can be a non-elliptical, two-dimensional design. For example, the design in FIG. 16 is an isosceles triangle oriented with a point of the triangle directed vertically up (e.g., in a direction opposite of the force of gravity). A galvanometer can be used to form the design (e.g., by oscillating a mirror in a pattern to reflect a laser beam). Instead of a laser, the design can be made by a mask covering an incoherent light source.

In some embodiments, orientation data of the wearable device is at least partially based on the design of the target. For example, the target could be a vertical line, a horizontal line, or a plus sign "+" (e.g., having a vertical line and a horizontal line) by translating a laser beam vertically, horizontally, or both vertically and horizontally. One or more processors can be configured to ascertain an orientation of the wearable device in relation to the environment based on an orientation of a design of the target 1504. For example, in FIG. 16 an orientation of the target 1504 in relation to the environment is known, and the wearable device determines an orientation of the wearable device based on the known orientation of the design of the target 1504. For example, vertical is determined by a point of the triangle and horizontal is determined by a horizontal line of the triangle.

In some configurations, the wearable device receives location data based on the target 1504 and derives orientation data based on a feature in the environment. For example, the target 1504 could be a laser dot. The laser dot does not provide relative orientation information of the wearable device to the environment. However, the wearable device could identify a horizontal edge 1604 and/or a vertical edge 1608 to determine relative orientation of the wearable device to the environment, wherein the horizontal edge 1604 and the vertical edge 1608 are features of the environment. A first horizontal edge 1604-1 is formed by an intersection of a floor with a wall. A second horizontal edge 1604-2 is formed by an intersection of a ceiling with the wall. The vertical edge 1608 is formed by a corner of a wall of an entryway. Images of features acquired by a camera of the wearable device provide information to the wearable device about orientation (e.g., with or without further data acquired by an IMU).

The optical display 120 produces a virtual object 1516 to appear in relation to the environment. The virtual object 1516 in FIG. 16 is an outline for an electrical box of a light switch positioned near the entryway. The virtual object 1516 can be positioned in relation to features in the environment. For example, the virtual object 1516 is shown to the user so that a bottom of the virtual object 1516 is a predetermined distance (e.g., 48 inches; according to building code(s)) from the first horizontal edge 1604-1 (e.g., from the floor).

Many variations using a target are possible. For example, different patterns for a design could be stored in a design library and chosen by the user depending on a given use or preference. The user could select the design of the target 1504 using a menu presented to the user using the optical display 120 (e.g., an augmented-reality system presents a menu of five different target designs to the user, the user gestures to select a specific target design, and the augmented-reality system identifies the gesture to select one of the five targets; the augmented-reality system transmits the selection of the target the base station; and the base station changes the pattern of the target accordingly). In some embodiments, the user can lock the target 1504 in place so that the target 1504 does not move with the user (e.g., by the user gesturing to lock the target). The user can also move the location of the target 1504 (e.g., by gesture commands being identified by the wearable device and transmitted to the base station).

Figure 17:
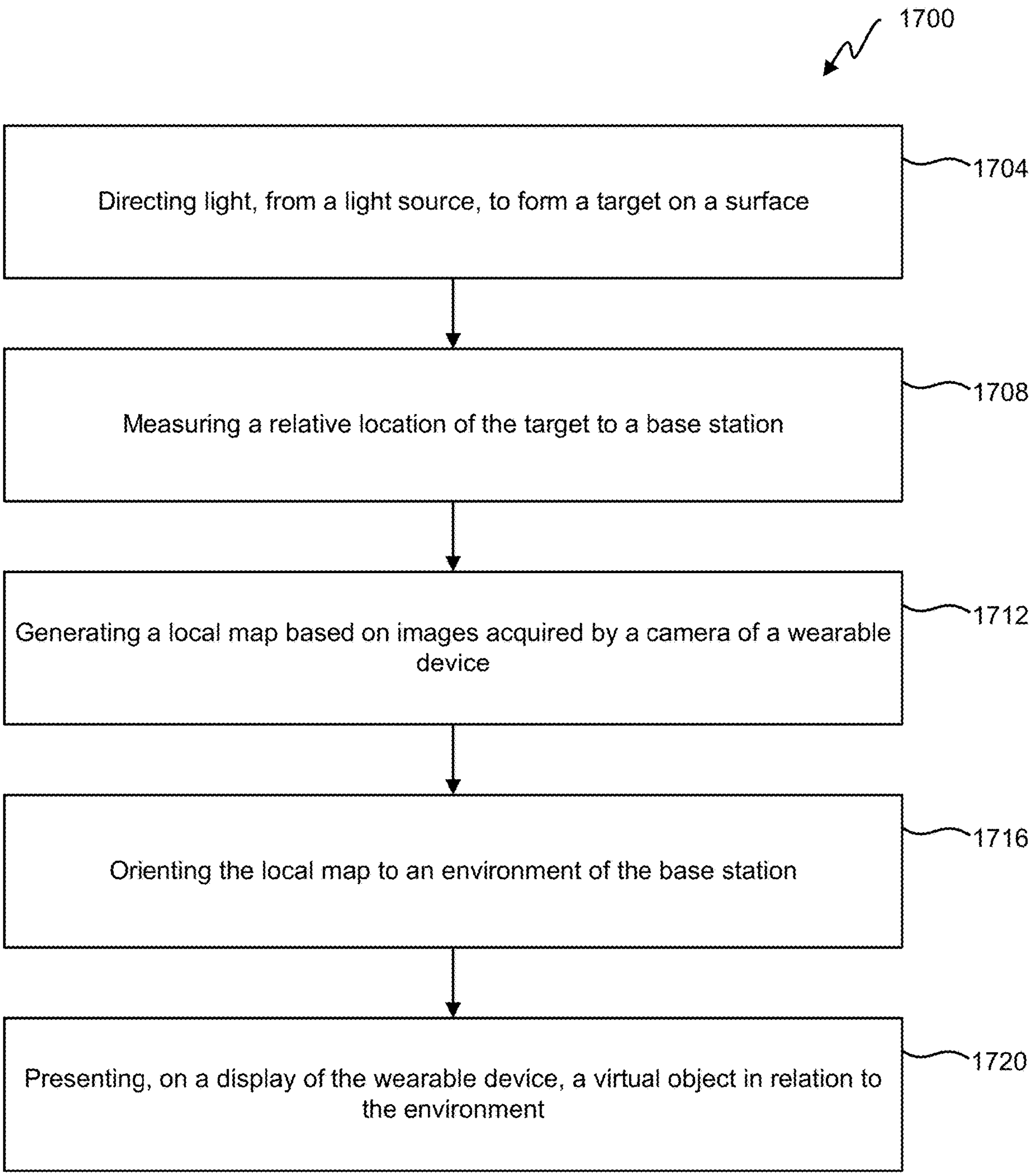
FIG. 17 illustrates a flowchart of an embodiment of a process for using a target as truth.

FIG. 17 illustrates a flowchart of an embodiment of a process 1700 for using a target as truth. Process 1700 begins in step 1704 with directing light, from a light source, to form a target on a surface. For example, light source 1508 directs an optical beam to form a target 1504 on a wall in FIG. 15.

A relative location of the target is measured to a base station, step 1708. For example, the base station 108 in FIG. 15 is a robotic total station, and the robotic total station measures a relative position of the target 1504 to the base station 108.

In step 1712, a local map is generated based on images acquired by a camera of a wearable device. The local map includes a relative location of the target to the wearable device. For example, the wearable device 904 in FIG. 15 is an augmented-reality device comprising a plurality of cameras. The plurality of cameras acquire images, and the local map is generated based on images from the plurality of cameras.

The local map is oriented to the environment, in step 1716, based on the relative location of the target to the base station, the relative location of the target to the wearable device, and a relative location of the base station to the environment. A virtual object is presented (e.g., to a user) on a display of the wearable device in relation to the environment, and/or one or more coordinates of a physical object is measured, based on orienting the local map of the wearable device with the environment.

A method can comprise, and/or processors can be configured to perform the steps: ascertaining a depth and/or orientation of a physical object in relation to the wearable device; calculating three-dimensional coordinates of the physical object in relation to the environment, wherein: the local map includes a relative location of the physical object to the wearable device, and/or calculating the three-dimensional coordinates of the physical object is based on the relative location of the physical object to the wearable device, the relative location of the physical object to the wearable device, the relative location of the target to the base station, and/or the relative location of the bases station to the environment; ascertaining an orientation of the wearable device in relation to the environment based on an orientation of a design of the target; ascertaining an orientation of the wearable device in relation to the environment based on a feature of the environment (e.g., an edge of a wall and the floor); tracking an eye of the user; moving a position of the target based on tracking the eye of the user; and/or moving a position of the target in response to movement of the wearable device.

In some embodiments, a wearable device is used to free up hands of a user (e.g., so the user can hold a surveying pole) or to increase a field of view of the user. In some embodiments, a device other than a wearable device is used. For example, a mobile device (e.g., a tablet or a smart phone) having a camera and a screen could be used. The mobile device could be hand held or removably attached to the surveying pole.

Figure 18:
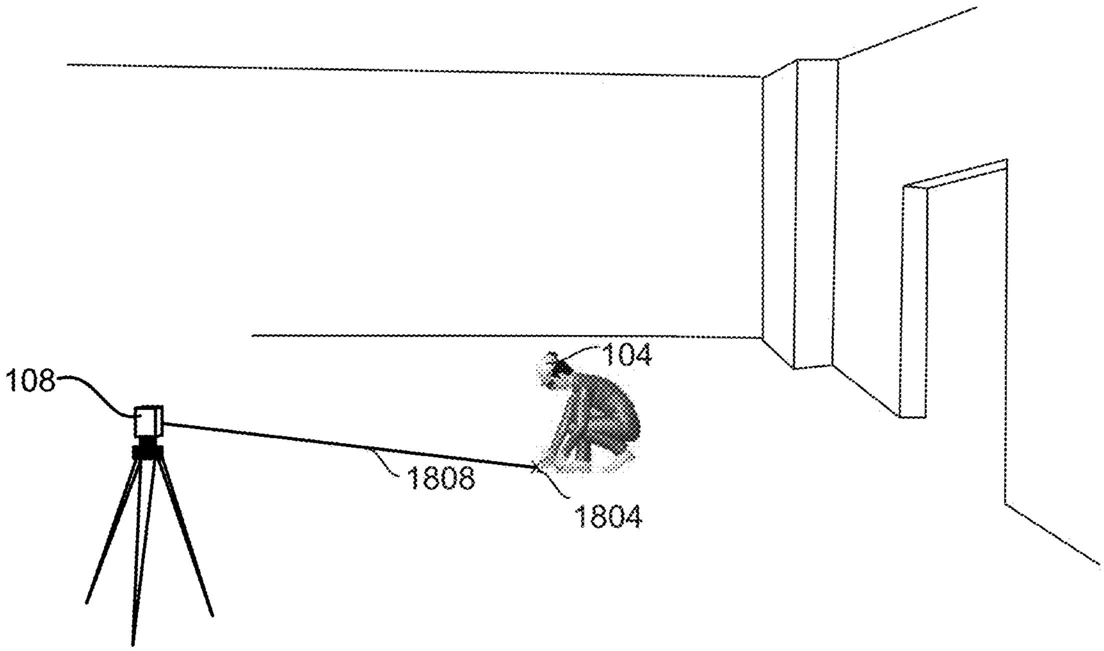
FIG. 18 depicts an embodiment of a user marking a position to orient a local map of a wearable device to an environment.
Figure 19:
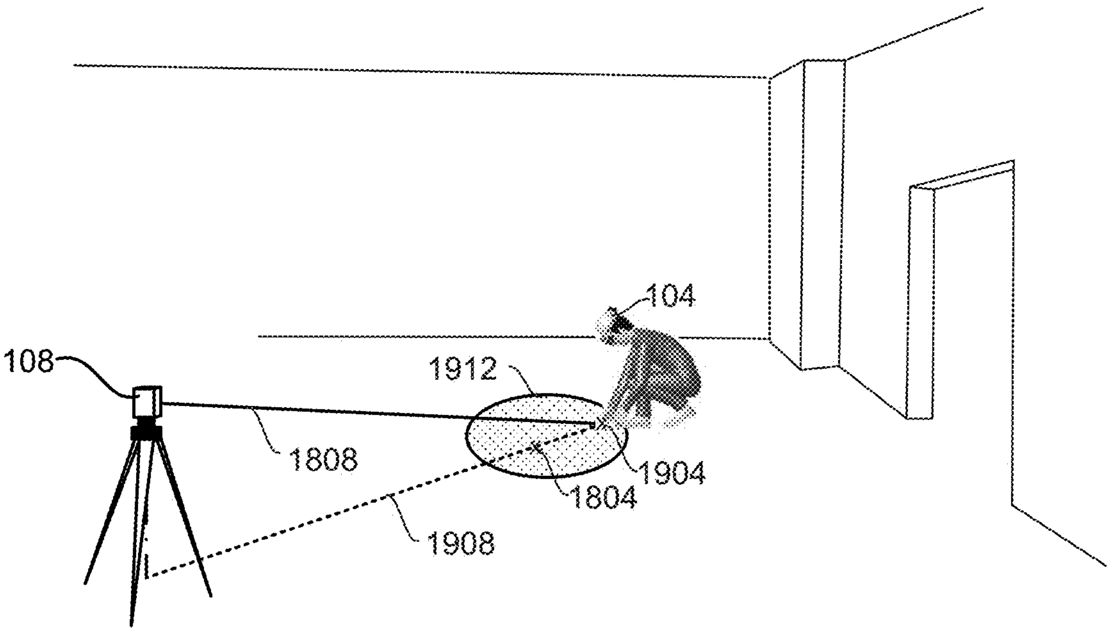
FIG. 19 depicts an embodiment of a user marking a second position to orient the local map to the environment.

FIGS. 18 and 19 demonstrate embodiments of orienting a local map of a wearable device (e.g., wearable device 104 or 109) to an environment (e.g., to a coordinate system of a base station 108 for a layout process). The wearable device 104 creates a local map of an area, but it can be challenging to orient the local map to an (e.g., a room, a construction site, a building foundation, etc.).

FIG. 18 depicts an embodiment of a user marking a first position 1804. The user is using the wearable device 104 to control the base station 108 for laying out points. The wearable device 104 creates a local map of a scene (e.g., a 3D mesh using a SLAM algorithm and/or stereo cameras). The base station 108 shines a laser spot at the first position 1804. The base station 108 is oriented to the environment. The base station 108 records the first position 1804 in relation to the environment and/or sends coordinates of the first position 1084 to the wearable device 104. For example, the base station 108 is a total station configured to precisely calculate a position of a laser spot. The user marks the first position 1804. In some embodiments the first position is marked with chalk, a pencil, a pen, a permanent marker, etc. (e.g., by the user drawing an 'X'); is marked by using a piece of tape; is marked by the user driving in a nail or screw at the first position 1804; is marked by a target (e.g., a sticker, a coin, a washer, a rubber washer); or is marked by a laser spot from the base station 108. The user provides an instruction for the wearable device 104 to mark the first position 1804 in the local map. In some embodiments, the wearable device 104 orients the local map with the environment based on the first position 1804 and/or features identified in the local map (e.g., comparing features in the local map to a CAD model of the environment). A path 1808 of a laser of the base station 108 is shown from the base station 108 to the first position 1804.

FIG. 19 depicts embodiments of a user marking a second position 1904. In some situations, the local map does not have many features. For example, the floor of a room could be concrete, which appears mostly the same to the wearable device. Accordingly, in some embodiments, the second position 1904 is used to orient the local map to the environment. In some embodiments, the second position 1904 is marked similarly as the first position 1804, though in some embodiments the second position 1904 is marked differently than the first position 1804 (e.g., the first position 1804 marked with an X or blue token and the second position 1904 marked with a triangle or a red token).

After marking the first position 1084 in the local map, the user instructs the base station 108 to point to the second position 1904. In the embodiment shown, the base station 108 moves the laser (e.g., drops or lifts) to point in a direction so that a line 1908 through the first position 1804 and the second position 1904 points toward the base station 108; though in other embodiments the second position 1904 is to a side or other direction in relation to the first position

1804 (e.g., not on line 1908. Having the first position 1804 and the second position 1904 in the line 1908 toward the base station 108 can simplify some equations and/or indicate to the wearable device 104 a direction of the base station 108 (e.g., so the wearable device 104 can track a position of the base station 108). The path 1808 of the laser of the base station 108 is shown from the base station 108 to the second position 1904. The wearable device 104 has a field of view 1912. The first position 1804 and the second position 1904 are within the field of view 1912 of the wearable device. In some embodiments, the base station 108 lifts the laser, and the user moves away from the base station 108, so that the first position 1804 and the second position 1904 are between the user and the base station 108 (e.g., so that the user does not block the path 1808 or the first position 1804). The local map is oriented to the environment based on both the first position 1804 and the second position 1904. For example, the wearable device 104 receives coordinates of the first position 1804 and the second position 1904 from the base station 108.

In some embodiments a method for orienting the local map to the environment comprises marking a first position (e.g., based on a laser from the base station 108 shining to the first position) in the local map (e.g., the wearable device 104 identifying the first position in relation to the local map); recording the first position in relation to the environment (e.g., receiving coordinates of the first position from the base station 108). Marking a second position (e.g., based on the laser from the base station 108 moving a laser spot to the second position) in the local map (e.g., the wearable device 104 identifying the first position in relation to the local map); recording the second position in relation to the environment (e.g., receiving coordinates of the second position from the base station 108); and/or orienting the local map to the environment based on the first position and the second position in both the local map and the environment.

Figure 20:
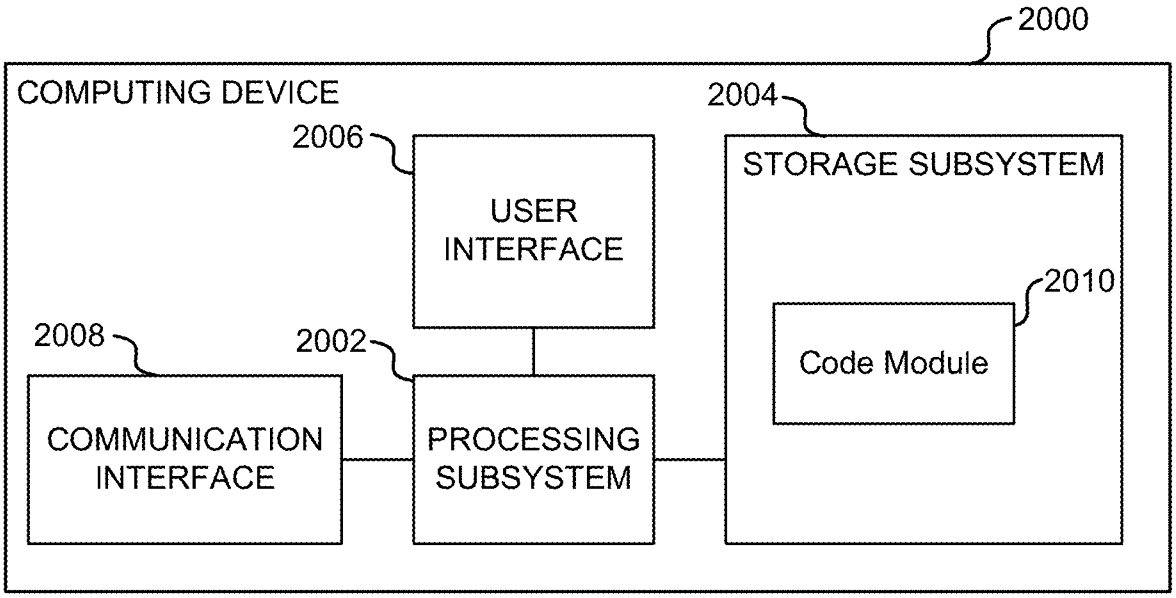
FIG. 20 depicts a block diagram of an embodiment of a computer system.

FIG. 20 is a simplified block diagram of a computing device 2000. Computing device 2000 can implement some or all functions, behaviors, and/or capabilities described above that would use electronic storage or processing, as well as other functions, behaviors, or capabilities not expressly described. Computing device 2000 includes a processing subsystem 2002, a storage subsystem 2004, a user interface 2006, and/or a communication interface 2008. Computing device 2000 can also include other components (not explicitly shown) such as a battery, power controllers, and other components operable to provide various enhanced capabilities. In various embodiments, computing device 2000 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 2004 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 2004 can store one or more applications and/or operating system programs to be executed by processing subsystem 2002, including programs to implement some or all operations described above that would be performed using a computer. For example, storage subsystem 2004 can store one or more code modules 2010 for implementing one or more method steps described above.

A firmware and/or software implementation may be implemented with modules (e.g., procedures, functions, and so on). A machine-readable medium tangibly embodying instructions may be used in implementing methodologies described herein. Code modules 2010 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 2010) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 2010 may comprise sets of instructions (codes) embodied on a computer-readable medium that directs a processor of a computing device 2000 to perform corresponding actions. The instructions may be configured to run in sequential order, in parallel (such as under different processing threads), or in a combination thereof. After loading a code module 2010 on a general purpose computer system, the general purpose computer is transformed into a special purpose computer system.

Computer programs incorporating various features described herein (e.g., in one or more code modules 2010)

may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 2004 can also store information useful for establishing network connections using the communication interface 2008.

User interface 2006 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 2006 to invoke the functionality of computing device 2000 and can view and/or hear output from computing device 2000 via output devices of user interface 2006. For some embodiments, the user interface 2006 might not be present (e.g., for a process using an ASIC).

Processing subsystem 2002 can be implemented as one or more processors (e.g., integrated circuits, one or more single-core or multi-core microprocessors, microcontrollers, central processing unit, graphics processing unit, etc.). In operation, processing subsystem 2002 can control the operation of computing device 2000. In some embodiments, processing subsystem 2002 can execute a variety of programs in response to program code and can maintain multiple concurrently executing programs or processes. At a given time, some or all of a program code to be executed can reside in processing subsystem 2002 and/or in storage media, such as storage subsystem 2004. Through programming, processing subsystem 2002 can provide various functionality for computing device 2000. Processing subsystem 2002 can also execute other programs to control other functions of computing device 2000, including programs that may be stored in storage subsystem 2004.

Communication interface 2008 can provide voice and/or data communication capability for computing device 2000. In some embodiments, communication interface 2008 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 2008 can provide wired connectivity (e.g., universal serial bus, Ethernet, universal asynchronous receiver/transmitter, etc.) in addition to, or in lieu of, a wireless interface. Communication interface 2008 can be implemented using a combination of hardware (e.g., driver circuits, antennas, modulators/demodulators, encoders/decoders, and other analog and/or digital signal processing circuits) and software components. In some embodiments, communication interface 2008 can support multiple communication channels concurrently. In some embodiments the communication interface 2008 is not used.

It will be appreciated that computing device 2000 is illustrative and that variations and modifications are possible. A computing device can have various functionality not specifically described (e.g., voice communication via cellular telephone networks) and can include components appropriate to such functionality.

Further, while the computing device 2000 is described with reference to particular blocks, it is to be understood that these blocks are defined for convenience of description and are not intended to imply a particular physical arrangement of component parts. For example, the processing subsystem 2002, the storage subsystem, the user interface 2006, and/or the communication interface 2008 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 2000.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A system for surveying comprising:

a base station, for being positioned with respect to an environment;

an augmented-reality device comprising a camera; and one or more memory device containing instructions that, when executed, cause one or more processors to perform the following steps:

acquiring an image of the base station using the camera of the augmented-reality device;

calculating an offset from the augmented-reality device to the base station, based on the image of the base station acquired by the camera of the augmented-reality device;

calculating a position of the augmented-reality device with respect to the environment based on the offset from the augmented-reality device to the base station and the base station positioned with respect to the environment; and presenting, using the augmented-reality device, a virtual object in relation to the environment.

2. The system of claim 1, wherein the instructions further cause the one or more processors to orient a local map of the augmented-reality device with respect to the environment.

3. The system of claim 2, wherein orientation of the local map is further based on a corner in the environment imaged by a camera of the augmented-reality device.

4. The system of claim 1, wherein the base station is a robotic total station.

5. The system of claim 1, further comprising a surveying pole, and the instructions further cause the base station to measure a distance to the surveying pole.

6. The system of claim 1, wherein:

the augmented-reality device is a wearable device; and the camera is arranged on the wearable device to face backwards from a user while the wearable device is worn by the user.

7. The system of claim 1, wherein the base station comprises an electronic distance measurement unit for measuring a distance from the base station to the augmented-reality device.

8. A memory device comprising instructions that, when executed by one or more processors, cause the one or more processors to perform the following steps:

acquiring an image of a base station positioned with respect to an environment, using a camera of an augmented-reality device;

calculating an offset from the augmented-reality device to the base station, based on the image of the base station acquired by the camera of the augmented-reality device; and calculating a position of the augmented-reality device with respect to the environment based on the offset from the augmented-reality device to the base station and the base station positioned with respect to the environment.

9. The memory device of claim 8, wherein the instructions further cause the one or more processors to present, using the augmented-reality device, a virtual object in relation to the environment.

10. The memory device of claim 8, wherein the instructions further cause the one or more processors to orient a local map of the augmented-reality device with respect to the environment.

11. The memory device of claim 10, wherein orientation of the local map is further based on a corner in the environment imaged by a camera of the augmented-reality device.

12. The memory device of claim 10, wherein orientation of the local map is further based on a target in the environment, projected by the base station, imaged by a camera of the augmented-reality device.

13. The memory device of claim 12, wherein:

the camera used for acquiring the image of the base station is a first camera; and a second camera is used to image the target.

14. The memory device of claim 8, wherein the base station is a robotic total station.

15. The memory device of claim 8, wherein the augmented-reality device is a wearable device having the camera arranged on the wearable device to face backward from a user while the wearable device is worn by the user.

16. A method comprising:

acquiring an image of a base station positioned with respect to an environment, using a camera of an augmented-reality device;

calculating an offset from the augmented-reality device to the base station, based on the image of the base station acquired by the camera of the augmented-reality device; and calculating a position of the augmented-reality device with respect to the environment based on the offset from the augmented-reality device to the base station and the base station positioned with respect to the environment.

17. The method of claim 16, further comprising presenting, using the augmented-reality device, a virtual object in relation to the environment.

18. The method of claim 16, further comprising orienting a local map of the augmented-reality device with respect to the environment.

19. The method of claim 16, wherein:

the augmented-reality device is a wearable device; and the camera is arranged on the wearable device to face backwards from a user while the wearable device is worn by the user.

20. The method of claim 16, wherein:

the base station is a total station; and the augmented-reality device is a head-mounted display.

* * * * *